(12) United States Patent  (10) Patent No.: US 7,587,118 B2
Nobayashi et al.  (45) Date of Patent: Sep. 8, 2009

(54) RESONATOR AND DEVICE HAVING THE SAME

(75) Inventors: Kazuya Nobayashi, Kawasaki (JP); Hikaru Hoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 11/830,248

(22) Filed: Jul. 30, 2007

(65) Prior Publication Data

US 2008/0050066 A1  Feb. 28, 2008

(30) Foreign Application Priority Data

Jul. 31, 2006  (JP) .............................. 2006-207907

(51) Int. Cl.
    *G02B 6/10* (2006.01)
(52) U.S. Cl. .................... 385/146; 372/43.01
(58) Field of Classification Search ................. 385/129, 385/131
    See application file for complete search history.

(56) References Cited

U.S. PATENT DOCUMENTS

| | | | | |
|---|---|---|---|---|
| 5,406,573 A * | 4/1995 | Ozbay et al. | ............. | 372/43.01 |
| 5,471,180 A * | 11/1995 | Brommer et al. | ............. | 333/202 |
| 5,998,298 A * | 12/1999 | Fleming et al. | ............. | 438/692 |
| 6,093,246 A * | 7/2000 | Lin et al. | ....................... | 117/92 |
| 6,261,469 B1 * | 7/2001 | Zakhidov et al. | ............. | 216/56 |
| 6,274,293 B1 * | 8/2001 | Gupta et al. | ................. | 430/315 |
| 6,358,854 B1 * | 3/2002 | Fleming et al. | ............. | 438/692 |
| 6,465,742 B1 * | 10/2002 | Hiraoka et al. | ............. | 174/255 |
| 6,469,682 B1 * | 10/2002 | de Maagt et al. | ............ | 343/909 |
| 6,479,371 B2 * | 11/2002 | Noda | ......................... | 438/455 |
| 6,597,851 B2 * | 7/2003 | Johnson et al. | ............. | 385/131 |
| 6,618,535 B1 * | 9/2003 | Reynolds | ..................... | 385/129 |
| 6,640,034 B1 * | 10/2003 | Charlton et al. | ............. | 385/122 |
| 6,643,439 B2 * | 11/2003 | Notomi et al. | .............. | 385/125 |
| 6,683,898 B2 * | 1/2004 | Østergaard et al. | ........ | 372/43.01 |

(Continued)

FOREIGN PATENT DOCUMENTS

CA  2330866 A1 *  7/2001

(Continued)

OTHER PUBLICATIONS

Agi et al. "Design of ultrawideband photonic crystals for broadband antenna applications." 1994, Electronics letters, V. 30, N. 25, p. 2166.*

(Continued)

*Primary Examiner*—Frank G Font
*Assistant Examiner*—Peter Radkowski
(74) *Attorney, Agent, or Firm*—Fitzpatrick, Cella Harper & Scinto

(57) ABSTRACT

A resonator with a three-dimensional photonic crystal having a fewer number of layers presenting a basic period, having a wide frequency band presenting a complete photonic band gap, and operating in a single mode, as well as a device using the same are provided, the three-dimensional photonic crystal including a period defect member and a period structure member having periodically laminated plural layers including a refractive-index periodic structure, the plural layers including first to fourth layers each having a periodic structure, the period defect member being provided by a columnar structure disposed at the second or fourth layer and on an axis of the columnar structure formed in the second or fourth layer.

12 Claims, 16 Drawing Sheets

U.S. PATENT DOCUMENTS

| | | | | |
|---|---|---|---|---|
| 6,717,167 | B2* | 4/2004 | Noda | 250/559.3 |
| 6,738,551 | B2 | 5/2004 | Noda et al. | 385/130 |
| 6,812,482 | B2* | 11/2004 | Fleming et al. | 257/17 |
| 6,865,005 | B2* | 3/2005 | Aoki et al. | 359/237 |
| 6,993,235 | B2* | 1/2006 | Takagi et al. | 385/129 |
| 6,998,942 | B2* | 2/2006 | Kirihara et al. | 333/239 |
| 7,068,865 | B2* | 6/2006 | Hamann et al. | 385/8 |
| 7,085,467 | B2* | 8/2006 | Ikemoto et al. | 385/129 |
| 7,158,711 | B2* | 1/2007 | Tokushima | 385/131 |
| 7,177,513 | B2* | 2/2007 | Povinelli et al. | 385/129 |
| 7,181,120 | B2* | 2/2007 | Sugitatsu et al. | 385/131 |
| 7,184,642 | B2* | 2/2007 | Hoshi et al. | 385/129 |
| 7,194,174 | B2* | 3/2007 | Dridi et al. | 385/129 |
| 7,200,298 | B2* | 4/2007 | Kimura | 385/15 |
| 7,244,385 | B2* | 7/2007 | Aoki et al. | 264/484 |
| 7,248,770 | B2* | 7/2007 | Parker et al. | 385/129 |
| 7,274,849 | B2* | 9/2007 | Nobayashi et al. | 385/131 |
| 7,302,147 | B2* | 11/2007 | Takagi et al. | 385/129 |
| 7,308,181 | B2* | 12/2007 | Nobayashi et al. | 385/131 |
| 7,313,307 | B2* | 12/2007 | Ikemoto et al. | 385/129 |
| 7,389,023 | B2* | 6/2008 | Yeo et al. | 385/37 |
| 2001/0019037 | A1* | 9/2001 | Zakhidov et al. | 216/56 |
| 2001/0021569 | A1* | 9/2001 | Noda | 438/455 |
| 2001/0026857 | A1* | 10/2001 | Kinoshita | 428/105 |
| 2002/0009277 | A1* | 1/2002 | Noda et al. | 385/130 |
| 2002/0041749 | A1* | 4/2002 | Johnson et al. | 385/129 |
| 2003/0013274 | A1* | 1/2003 | Noda | 438/455 |
| 2003/0020501 | A1* | 1/2003 | Aoki et al. | 324/754 |
| 2003/0104700 | A1* | 6/2003 | Fleming et al. | 438/694 |
| 2003/0223721 | A1* | 12/2003 | Povinelli et al. | 385/129 |
| 2004/0027646 | A1* | 2/2004 | Miller et al. | 359/322 |
| 2004/0264903 | A1* | 12/2004 | Dridi et al. | 385/129 |
| 2005/0122568 | A1* | 6/2005 | Aoki et al. | 359/321 |
| 2005/0196118 | A1* | 9/2005 | Ikemoto et al. | 385/129 |
| 2005/0207717 | A1* | 9/2005 | Takagi et al. | 385/129 |
| 2006/0029349 | A1* | 2/2006 | Hoshi et al. | 385/129 |
| 2006/0083477 | A1* | 4/2006 | Takagi et al. | 385/147 |
| 2006/0124047 | A1* | 6/2006 | Enokido et al. | 117/2 |
| 2007/0036189 | A1* | 2/2007 | Hori et al. | 372/50.11 |
| 2007/0172190 | A1* | 7/2007 | Takagi et al. | 385/131 |

FOREIGN PATENT DOCUMENTS

| | | |
|---|---|---|
| JP | 2001074955 A * | 3/2001 |
| WO | WO 03/081306 A1 | 10/2003 |

OTHER PUBLICATIONS

Maldovan et al. "Exploring for 3D photonic bandgap structures in the 11 f.c.c. space groups," 2003, Nature Materials, V. 2, p. 664.*

Zerpenguzel, Ali, "Transmission Characteristics of Metallodielectric Photonic Crystals and Resonators," 2002, IEEE Microwave and Wireless Components Letters, V. 12, N. 4, p. 134.*

Aoki et al. "Microassembly of semiconductor three-dimensional photonic crystals," 2003, Nature Materials. V. 2, p. 117.*

Li et al. "Fragility of photonic band gaps in inverse-opal photonic crystals," 2000. Physical Review B, V. 62, N. 3, p. 1516.*

Maldovan et al. "Diamond-structured photonic crystals." 2004, Nature Materials, V. 3, p. 593.*

Soljacic et al. "Enhancement of nonlinear effects using photonic crystals." 2004. Matire <ateroa;s. v/ 3. [/211.*

Pavarini et al. "Band structure and optical properties of opal photonic crystals." 2005, Physical REview B, V. 72., p. 045102-1.*

Vlasov et al. "On-chip natural assembly of silicon photonic bandgap crystals," 2001. Nature, V. 414, p. 289.*

Blanco et al. "Large-scale synthesis of a silicon photonic crystal with a complete three-dimentional bandgap near 1.5 micrometres," 2000. Nature. v. 405, p. 437.*

Noda et al. "Semiconductor Three-Dimensional and Two-Dimensional Photonic Crystals and Devices." 2002, IEEE Journal of Quantum Electronics, V. 38, No. 7, p. 726.*

Lin et al. "A Three-Dimensional Optical Photonic Crystal." 1999, Journal of Lightwave Technology, V. 17, N. 11. p. 1944.*

Eli Yablonovitch, "Inhibited Spontaneous Emission In Solid-State Physics and Electronics", Physical Review Letters, vol. 58, No. 20, May 18, 1987, pp. 2059-2062.

* cited by examiner

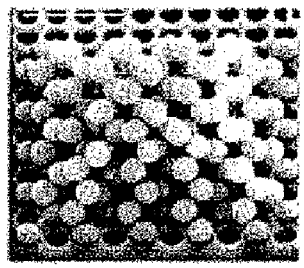 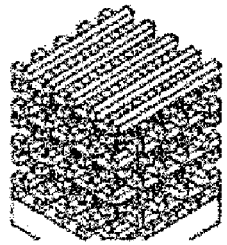 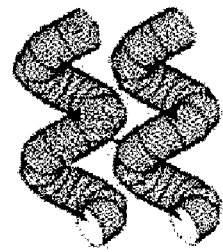
FIG.22A  FIG.22B  FIG.22C
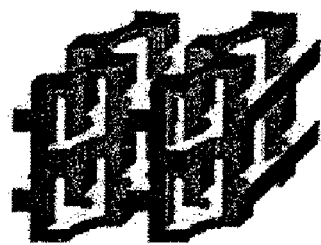 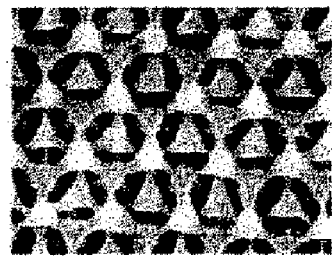 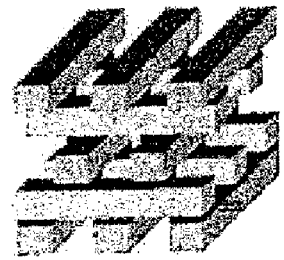
FIG.22D  FIG.22E  FIG.22F

RESONATOR AND DEVICE HAVING THE SAME

FIELD OF THE INVENTION AND RELATED ART

This invention relates to a resonator using a three-dimensional photonic crystal having a three-dimensional refractive-index periodic structure, and also to a device having such resonator.

The transmission and reflection characteristics of electromagnetic waves can be controlled based on a periodic structure not greater than the wavelength, as proposed by Yablonovitch (Physical Review Letters, Vol. 58, pp. 2059, 1987). Namely, by shortening the structural period to less than the wavelength of light, the transmission and reflection characteristics of light can be controlled. Such a structure is known as a photonic crystal. It has been suggested that, in a certain wavelength region, a mirror having a reflectance of 100% without any loss of light can be realized.

The wavelength region in which the reflectance of 100% is attainable is referred to as a photonic band gap, as compared with the energy gap of semiconductors.

Based on the three-dimensional periodic structure having a period not greater than the wavelength of light, the photonic band gap can be realized for the light being incident from every orientation. Hereinafter, this will be referred to as "complete photonic band gap".

For the three-dimensional photonic crystals realizing such complete photonic band gap, some structures are known such as shown in FIG. 22A-FIG. 22F.

FIG. 22A-FIG. 22F show, in this order, a diamond opal structure, a woodpile structure, a helical structure, a unique three-dimensional periodic structure, an inverse structure to the three-dimensional periodic structure, a diamond woodpile structure, respectively.

It is known that a resonator can be realized by introducing a defect member into a portion of the photonic crystal. Since resonators using a photonic crystal can strongly shut the light therein, these can be used as a light source when provided with an appropriate light output means.

When such photonic crystal is used as a light source, the optical function device can be downsized. It is known that a two-dimensional photonic crystal can be used as a resonator so far (U.S. Pat. No. 6,738,551).

Also, as an example wherein a period defect member is disposed in a portion of a three-dimensional photonic crystal, a woodpile structure having a point defect introduced thereinto is known (International Publication No. WO03081306).

According to WO03081306, only by providing a period defect member within a three-dimensional photonic crystal, the result is mere existence of plural resonance modes. WO03081306 discloses that a single-mode operating resonator can be realized by controlling the frequency change of the resonance mode based on the shape of the period defect member as well as the translational shift of the position of the period defect member.

As compared with three-dimensional photonic crystals, two-dimensional photonic crystals have an advantage of easiness of manufacture. However, there is a problem that three-dimensional optical confinement based on the complete photonic band gap is unattainable by that. Therefore, a resonator using a three-dimensional photonic crystal has been desired.

When a resonator is used for a laser device, it is necessary to keep a large interval between a desired resonance frequency and the resonance frequency of an adjoining resonance mode, so as to avoid adverse influences of the resonance mode having a close resonance frequency, such as mode hops, for example. For that reason, single-mode operation is desirable.

Here, the term "single mode" refers to such mode that, with respect to light of a single frequency, the wave can be guided in the state having a single wave vector.

In WO03081306, the frequency band presenting the complete photonic band gap of the woodpile structure is very narrow. This causes inconveniences that the wavelength controllable range of the resonance mode is narrow and the confinement effect of the frequency band that provides the complete photonic band gap is slow.

On the other hand, the manufacture of three-dimensional photonic crystals of lamination layer type uses semiconductor processing technology such as crystal growth, electron beam exposure and etching, for example, as well as nano imprinting techniques. Since the structures in individual layers should be formed sequentially using these techniques to obtain a lamination type structure, if the number of laminated layers becomes larger, the number of steps necessary for the manufacture inevitably increases. Therefore, it is desirable for the three-dimensional photonic crystal to have a structure by which the basic period can be provided by fewer layers.

The present invention in an aspect thereof provides a resonator working in a single mode, using a three-dimensional photonic crystal with a fewer number of layers forming its basic period and having a wider frequency band presenting a complete photonic band gap. The present invention in another aspect thereof provides a device having such a resonator.

SUMMARY OF THE INVENTION

In accordance with an aspect of the present invention, there is provided a resonator, comprising: a three-dimensional photonic crystal; and a period defect member provided in said three-dimensional photonic crystal, wherein said three-dimensional photonic crystal includes a periodic structure member having periodically laminated layers including a refractive index periodic structure, wherein said periodic structural member includes (i) a first layer having a periodic structure being provided with holes which comprise a second medium and which are formed at lattice points of a first rectangular lattice having a period $\underline{a}$ along a first axis extending along a plane of the first layer and a period b along a second axis extending along the plane of the first layer and being perpendicular to the first axis, and at lattice points of a second rectangular lattice defined at a position determined by shifting the first rectangular lattice by a/2 along the first axis and by b/4 along the second axis, wherein a region of the first layer other than the holes is filled with a first medium, (ii) a second layer having a periodic structure with a columnar structure which comprises a third medium and has an axis extending in a layer lamination direction and which is formed at lattice points of a face-centered rectangular lattice defined at a position determined by shifting the first rectangular lattice by +3b/8 along the second direction and having a period $\underline{a}$ along the first axis and a period b along the second axis, wherein a region of the second layer other than the columnar structure is filled with the second medium, (iii) a third layer having a periodic structure formed by providing the periodic structure included in the first layer at a position shifted by a/2 along the first axis and by b/2 along the second axis relative to the first layer and with respect to a direction along the plane of the second layer, and (iv) a fourth layer having a periodic structure formed by providing the periodic structure included in the second layer at the same position as the second layer with respect to a direction along the plane of the second layer, and wherein the first, second, third and fourth layers are laminated in this order.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 22A-FIG. 22F are schematic diagrams of conventional three-dimensional photonic crystals.

DESCRIPTION OF THE PREFERRED EMBODIMENTS

Preferred embodiments of the present invention will now be described with reference to the attached drawings.

Embodiment 1

Figure 1:
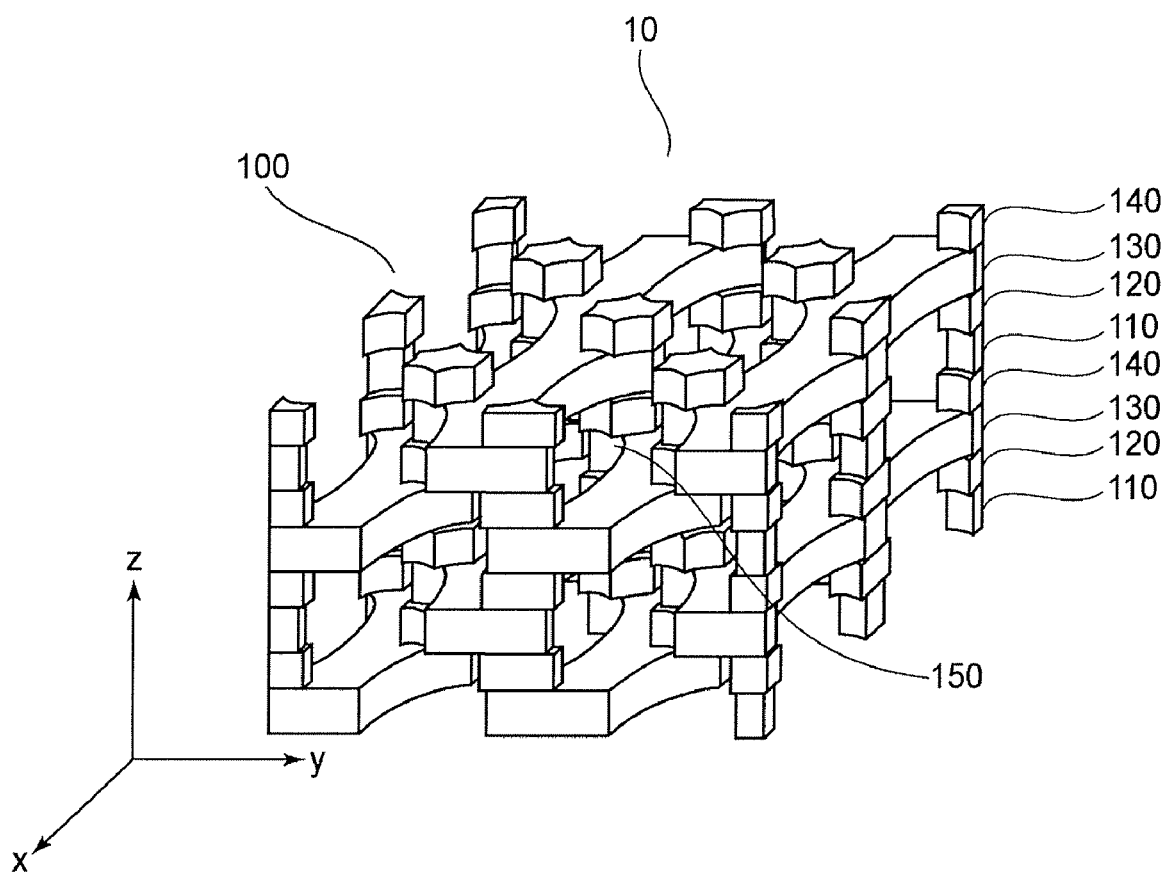
FIG. 1 is a perspective view of a main portion of a three-dimensional photonic crystal according to the present invention.

FIG. 1 is a schematic view of a resonator according to a first embodiment of the present invention, in which a period defect member is placed in a three-dimensional photonic crystal. Here, the x-axis, y-axis and z-axis are perpendicular to each other.

A resonator 10 of the first embodiment has a periodic structure member 100 and a period defect member (point defect member) 150 formed therein. The periodic structure member 100 is formed by periodically laminating plural layers including a refractive-index periodic structure to be described below. The periodic structure member 100 has a basic period which is defined by four layers, that is, first layer 110 (containing the x-y plane) to fourth layer 140.

FIG. 2A-2D are fragmentary schematic views, along the x-y section, of individual layers of FIG. 1.

Figure 2A:
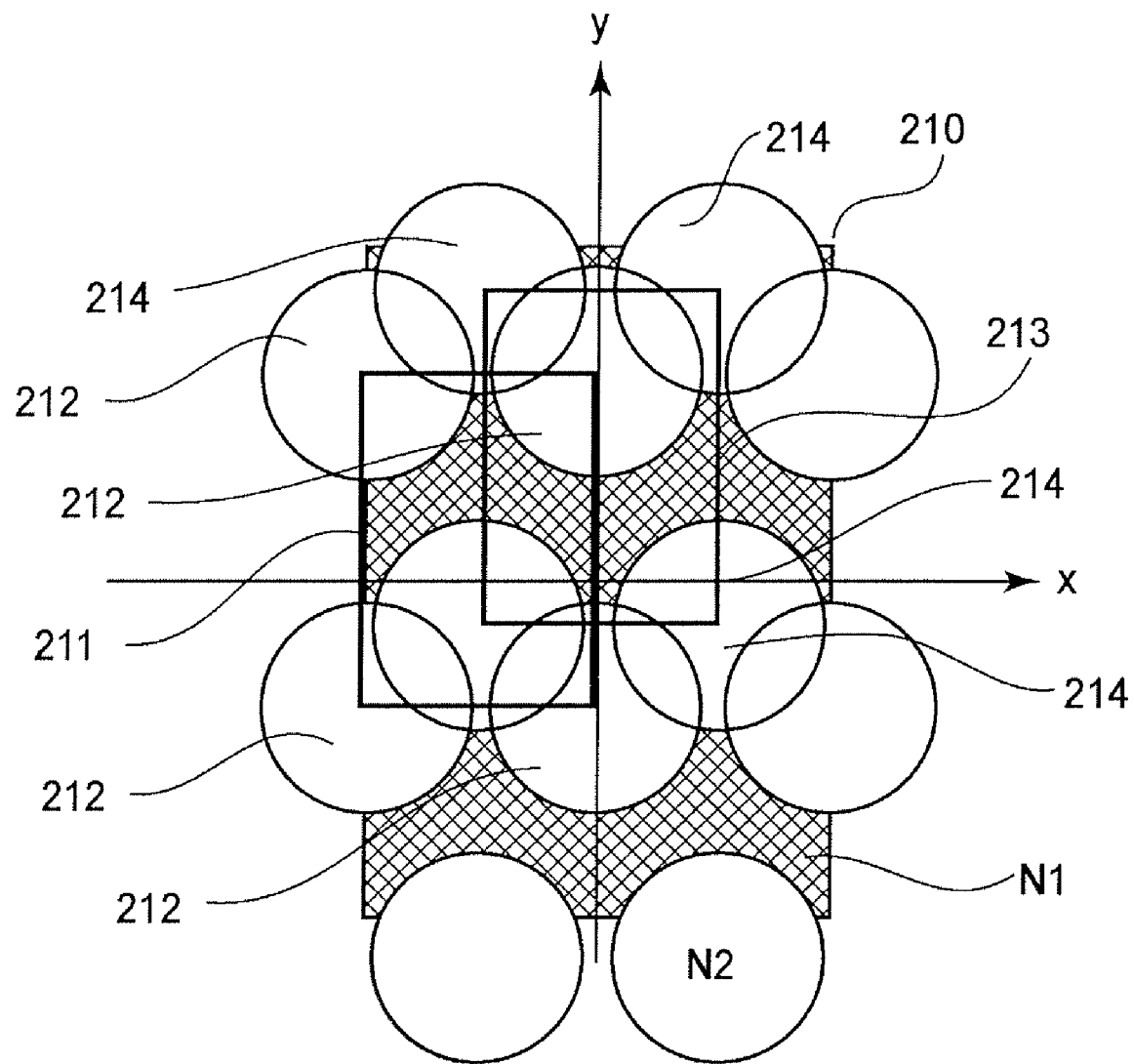
FIG. 2A-FIG. 2D are illustrations for explaining individual layers of a three-dimensional photonic crystal according to a first embodiment of the present invention.

FIG. 2A is a schematic view along the x-y section of a first layer 210. In FIG. 2A, denoted at 211 is a first rectangular lattice having a period a in the x-axis direction and a period b in the y-axis direction.

There are circular holes 212 defined at the lattice points of the first rectangular lattice 211, having a radius R1 and filled with a second medium N2 (refractive index N2) and also having a circular x-y sectional shape.

Denoted at 213 is a second rectangular lattice. This second rectangular lattice has the same shape as the first rectangular lattice 211 and is placed at the position deviated by a/2 in the x-axis direction and by b/4 in the y-axis direction, as compared with the first rectangular lattice 211. There are circular holes 214 defined at the lattice points of the second rectangular lattice 213, having a radius R1 and filled with the second medium N2. Furthermore, the regions of the first layer 210 other than the circular holes 212 and 214 are filled with a first medium N1 (refractive index N1). Here, N2<N1.

Figure 2B:
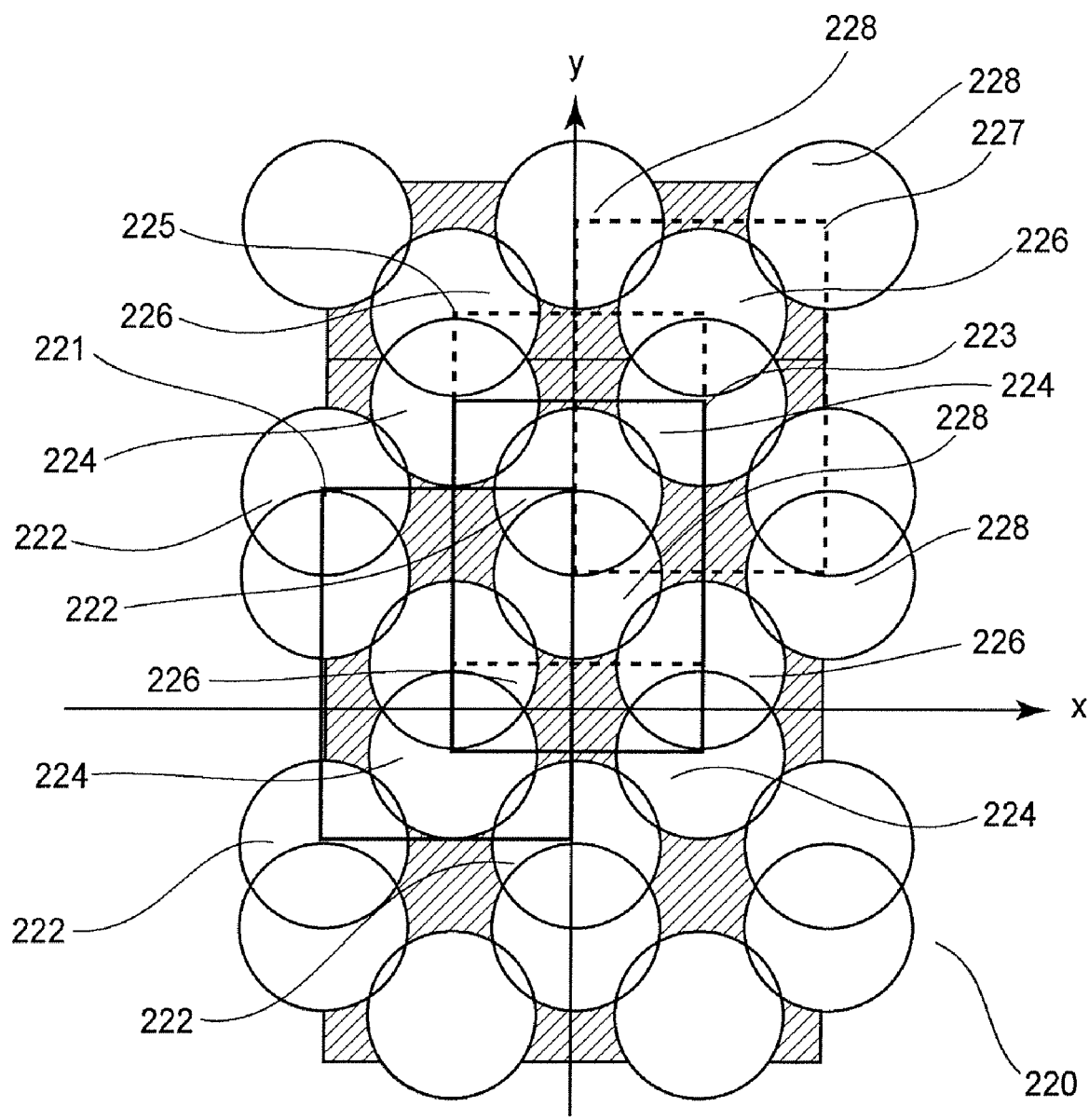
Figure 2C:
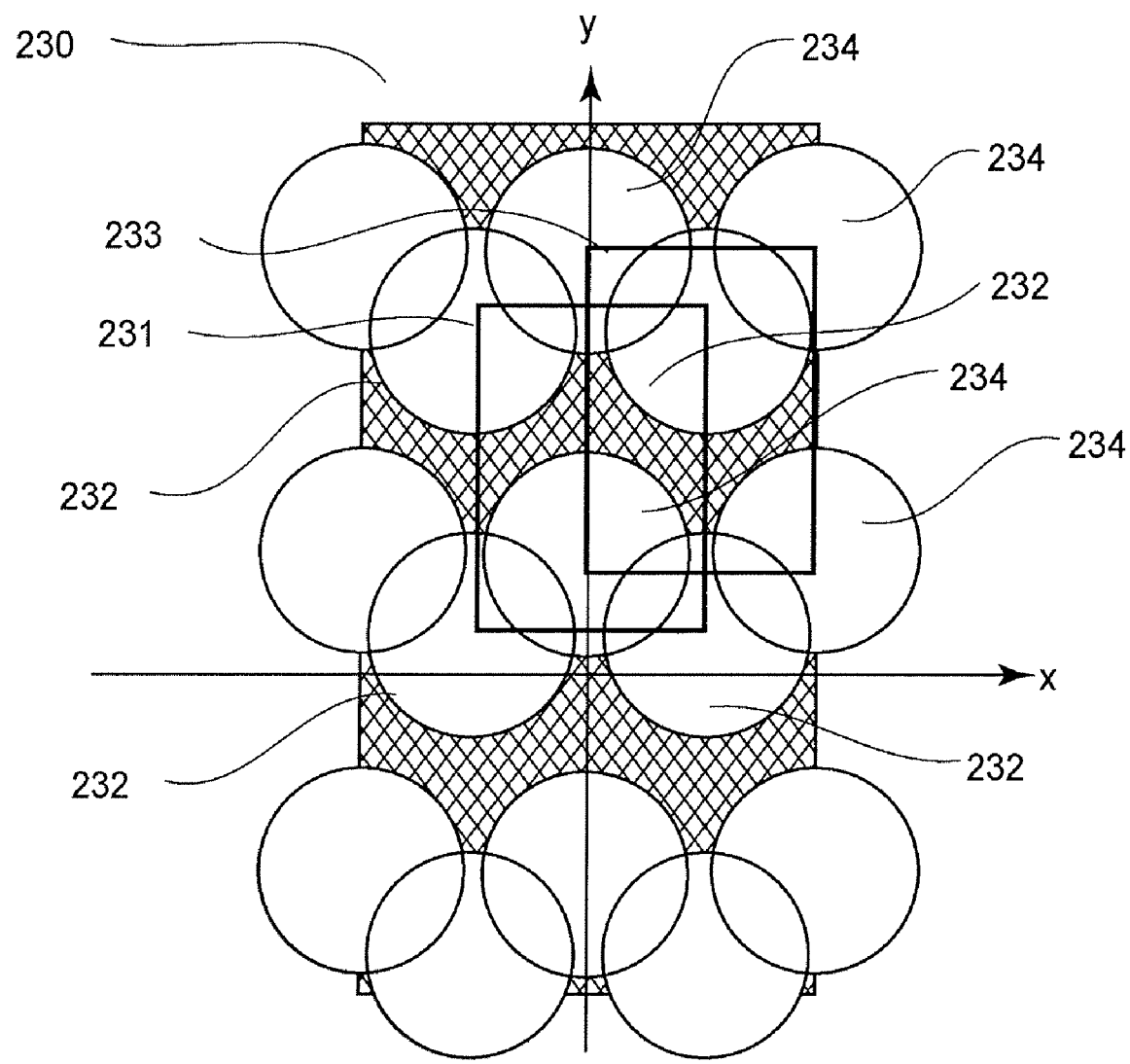

FIG. 2C is a schematic view along the x-y section of a third layer 230. In FIG. 2C, denoted at 231 is a third rectangular lattice. This third rectangular lattice has the same shape as the first rectangular lattice 211 in first layer 210. It is placed at the position deviated by a/2 in the x-axis direction and by b/2 in the y-axis direction, as compared with the first rectangular lattice 211. There are circular holes 232 defined at the lattice points of the third rectangular lattice 231, having a radius R1 and filled with the second medium N2.

Furthermore, denoted at 233 is a fourth rectangular lattice. This fourth rectangular lattice has the same shape as the second rectangular lattice 213 and is placed at the position deviated by a/2 in the x-axis direction and by b/2 in the y-axis direction, as compared with the second rectangular lattice 213. There are circular holes 234 defined at the lattice points of the fourth rectangular lattice 233, having a radius R1 and filled with the second medium N2. In addition, the regions of the third layer 230 other than the circular holes 232 and 234 are filled with the first medium N1 (refractive index N1).

FIG. 2B is a schematic view along the x-y section of a second layer 220. In FIG. 2B, denoted at 221 and 223 are a 21st rectangular lattice and a 22nd rectangular lattice, respectively. These lattices are placed at the same positions as the first rectangular lattice 211 and the second rectangular lattice 213 in first layer 210, respectively. There are circular holes 222 and 224 defined at the lattice points of the 21st rectangular lattice 221 and the 22nd rectangular lattice 223, having a radius R2 and filled with the second medium N2.

Furthermore, in the second layer 220, denoted at 225 and 227 are a 23rd rectangular lattice and a 24th rectangular lattice, respectively. These lattices are placed at the same positions as the third rectangular lattice 231 and the fourth rectangular lattice 233 in the third layer 230, respectively. There are circular holes 226 and 228 defined at the lattice points of the 23rd rectangular lattice 225 and the 24th rectangular lattice 227, having a radius R2 and filled with the second medium N2. In addition, the regions of the second layer other than the circular holes 222, 224, 226 and 228 are filled with a third medium N3 (refractive index N3). As a result of placing the circular holes at the positions mentioned above, the 21st rectangular lattice 221 is formed at the position deviated by +3b/8 in the y-axis direction. Furthermore, a columnar structure 150a consisting of a third medium N3 is provided at the lattice point of a face-centered rectangular lattice having a period a in the x-axis direction and a period b in the y-axis direction.

In other words, in the second layer 220, there is a columnar structure 150a comprising a third medium N3 placed at the lattice point of the face-centered rectangular lattice, and the regions except the columnar structure are filled with the second medium N2.

Figure 2D:
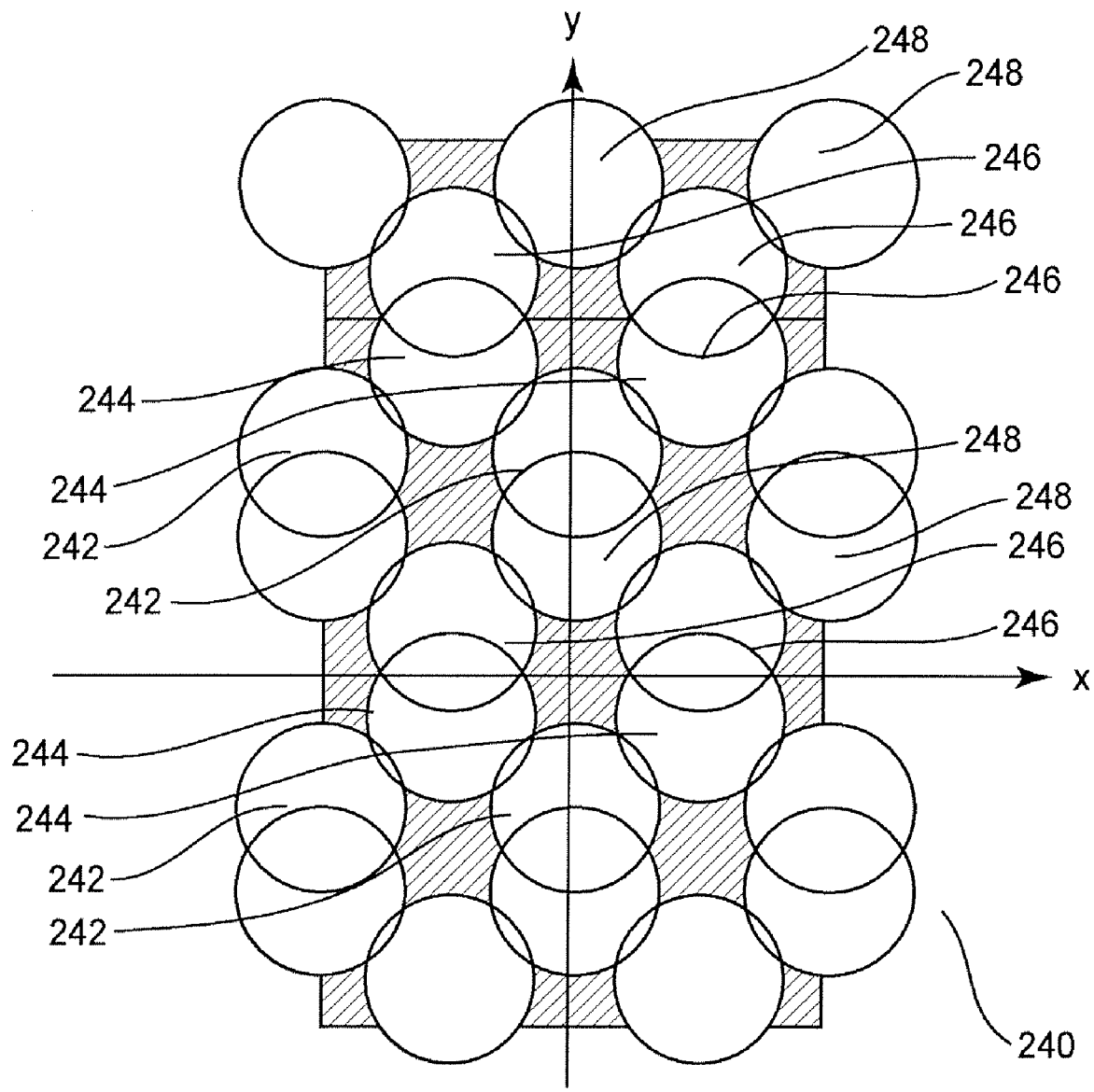

FIG. 2D is a schematic view along the x-y section of a fourth layer 240. In FIG. 2D, the fourth layer 240 has circular holes 242, 244, 246 and 248 having the same medium and the same shape as the circular holes 222, 224, 226 and 228 provided in the second layer 220, the holes 242-248 being formed at the same positions as the holes 222-228.

Also, the regions of the fourth layer 240 other than the circular holes 242, 244, 246 and 248 are filled with the third medium N3 (high refractive index N3).

By arranging the periodic structure member 100 in the manner described above, a three-dimensional photonic crystal having a wide frequency band, presenting a complete photonic band gap, can be realized by use of a fewer number of layers (the basic period is provided by four layers, in this example).

Figure 3:
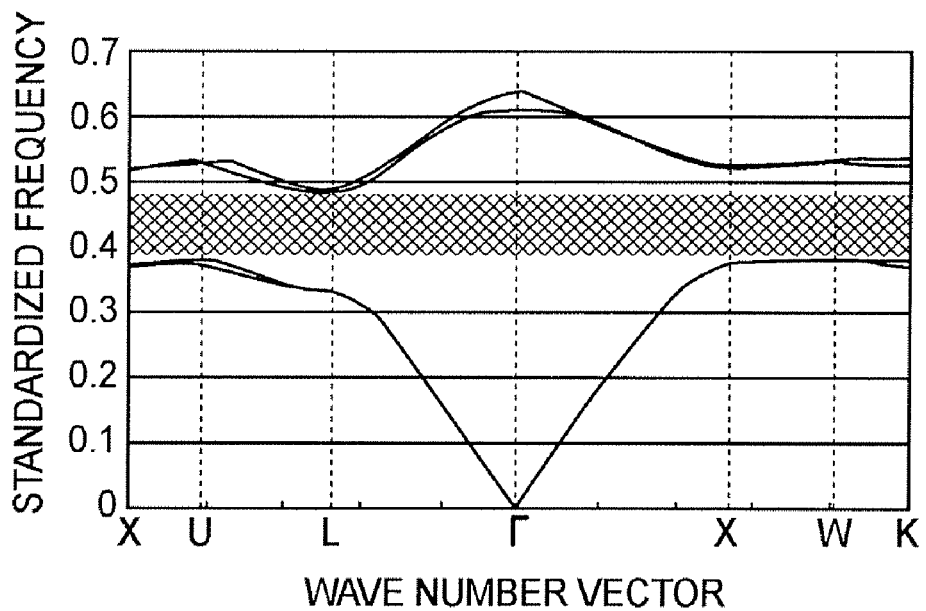
FIG. 3 is an illustration based on plane-wave extraction, for explaining the photonic band gap structure of the three-dimensional photonic crystal according to the first embodiment of the present invention.

In this embodiment, the refractive indices N1-N3 of the individual mediums, the circular-hole radii R1 and R2 formed in the layers, the periods and the thicknesses of these layers may have numerical values shown in Table 1. The values in Table 1 have been standardized with respect to the period a. FIG. 3 shows the results obtained by analyzing this photonic band structure based on the plane wave unfolding method. In FIG. 3, the axis of abscissas presents the wave vector, that is, the incidence direction of the electromagnetic wave which is incident on the photonic crystal. In FIG. 3, as an example, the point K shows a wave vector parallel to the z-axis, and the x-axis presents a wave vector having a tilt of 45 degrees with respect to the z-axis (or x-axis) in the x-y plane. On the other hand, the axis of ordinate presents the frequency (normalized frequency) being standardized with respect to the lattice period. In the region from the normalized frequency 0.380 to 0.478 shown by the hatching in FIG. 3, no light can exist regardless of the incidence direction of the light. In other words, a complete photonic band gap is being formed in this region. For example, if the period a is 0.5 μm, a complete photonic band gap is formed in the wavelength region from 1.05 μm to 1.32 μm. If the period a is 0.2 μm, a complete photonic band gap is formed in the wavelength region from 0.418 μm to 0.526 μm.

Figure 4:
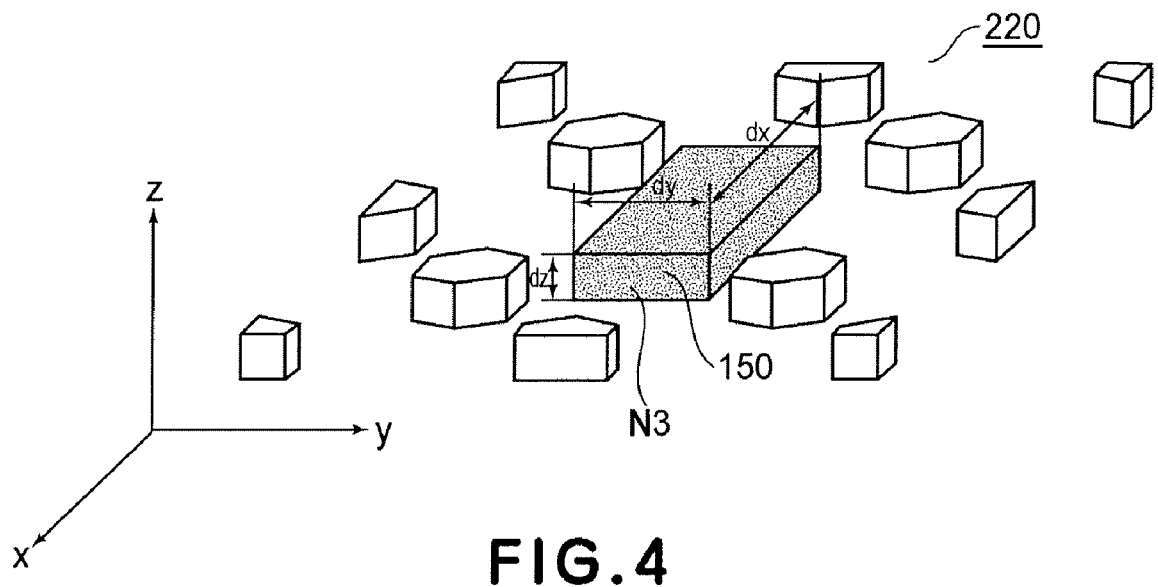
FIG. 4 is an illustration of a portion around the period defect member shown in FIG. 1.

FIG. 4 is an illustration of the period defect member 150.

Figure 5:
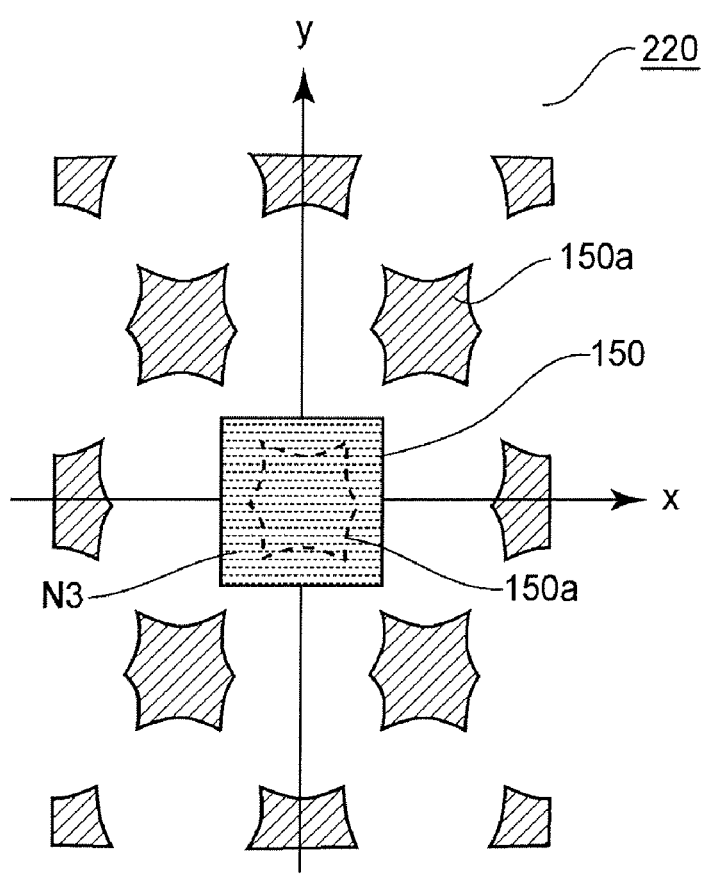
FIG. 5 is an x-y sectional view of the structure shown in FIG. 4.

The period defect member 150 is provided in the second layer 220 (FIG. 2B) and on the axis (z direction) of the columnar structure 150a which is placed at the second layer 220. FIG. 5 is an x-y sectional view of the period defect member 150 shown in FIG. 4.

In FIG. 5, for better understanding of the position of the period defect member 150, the columnar structure 150a when the period defect member 150 is not formed is illustrated by broken lines. As shown in FIG. 4, the period defect member 150 comprises a third medium N3 and has a rectangular parallelepiped shape with a thickness dz and widths dx and dy.

By forming the period defect member 150 in the manner described above, it is assured that, with respect to the electromagnetic wave of a particular frequency band among the frequency band inside the photonic band gap of the periodic structure member 100, the electromagnetic wave exists only in the defect member.

As a result of this, the electromagnetic wave can be confined in a very small region, and hence a high-performance resonator having high light confinement effect is accomplished thereby.

Hereinafter, the electromagnetic wave allowed to exist in the photonic band gap by the introduction of the period defect member 150 will be referred to as "defect mode". Also, the frequency thereof will be referred to as "defect mode frequency", and the energy distribution of electromagnetic wave inside the resonator and formed by the period defect will be referred to as "defect mode pattern".

Figure 6:
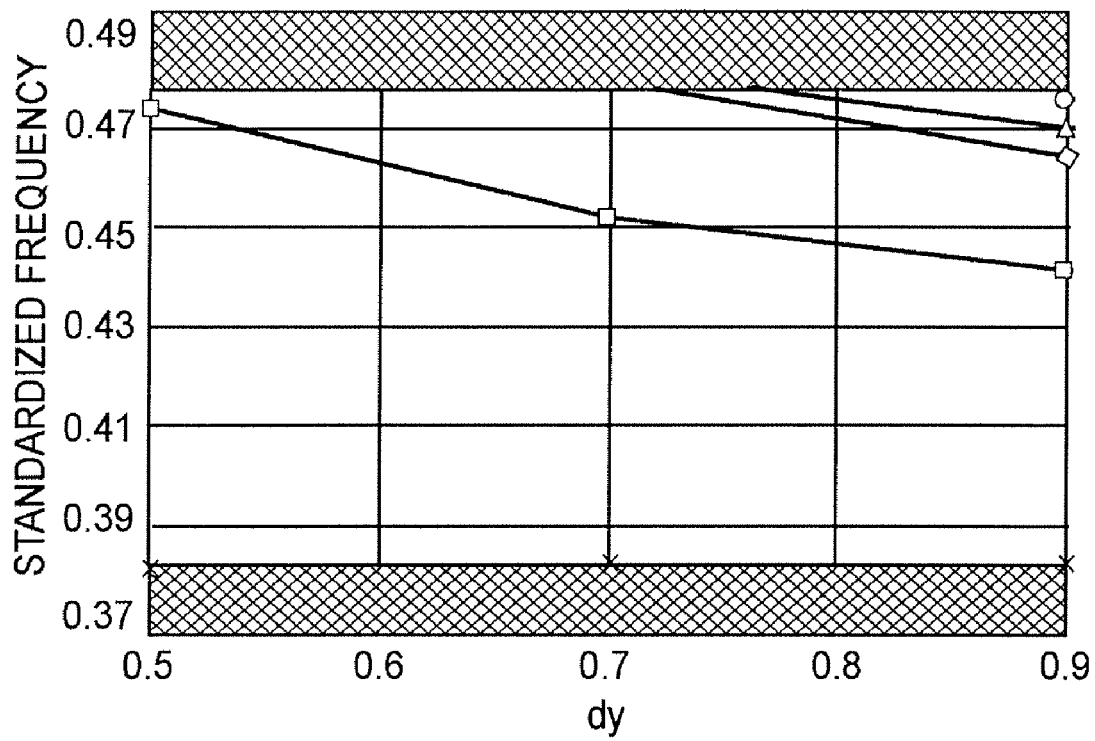
FIG. 6 is an illustration based on plane-wave extraction, for explaining the photonic band gap structure according to the first embodiment of the present invention.
Figure 7:
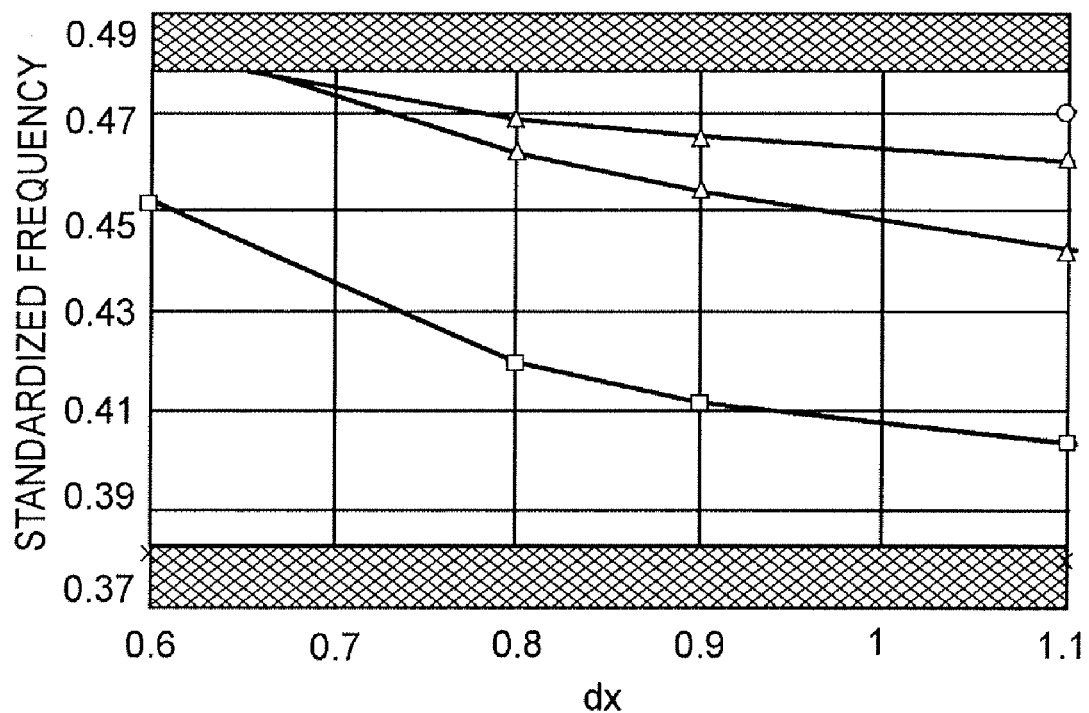
FIG. 7 is an illustration based on plane-wave extraction, for explaining the photonic band gap structure according to the first embodiment of the present invention.

FIG. 6 and FIG. 7 show the results of calculation based on FDTD method (finite difference time domain method), made to reveal how the defect mode frequency changes to the parameters of the defect shape of the period defect member 150, in the resonator 10 shown in FIG. 1.

FIG. 6 shows the relationship of the defect mode frequency to the dimension of dy, taking dx=0.60*a and dz=0.25*a. Also, FIG. 7 shows the relationship of the defect mode frequency to dx, taking dy=0.70*a and dz=0.25*a.

In the period defect member 150 for which the calculations were carried out, the barycentric coordinates in the x and y directions are disposed on the axis of the columnar structure 150a (FIG. 2B). Also, the barycentric coordinates in the z direction are placed at the central position of the second layer. The frequency domain shown in FIG. 6 and FIG. 7 by hatching is a frequency spectrum outside the complete photonic band gap.

When the parameters of the defect shape are changed, the change of the defect mode frequency to the defect shape is different in dependence upon each parameter. Based on this difference of change, it becomes possible to provide a large defect-mode frequency interval, thereby to reduce the adverse influence of an adjoining defect mode frequency and to set the defect mode at a desired frequency.

Figure 8:
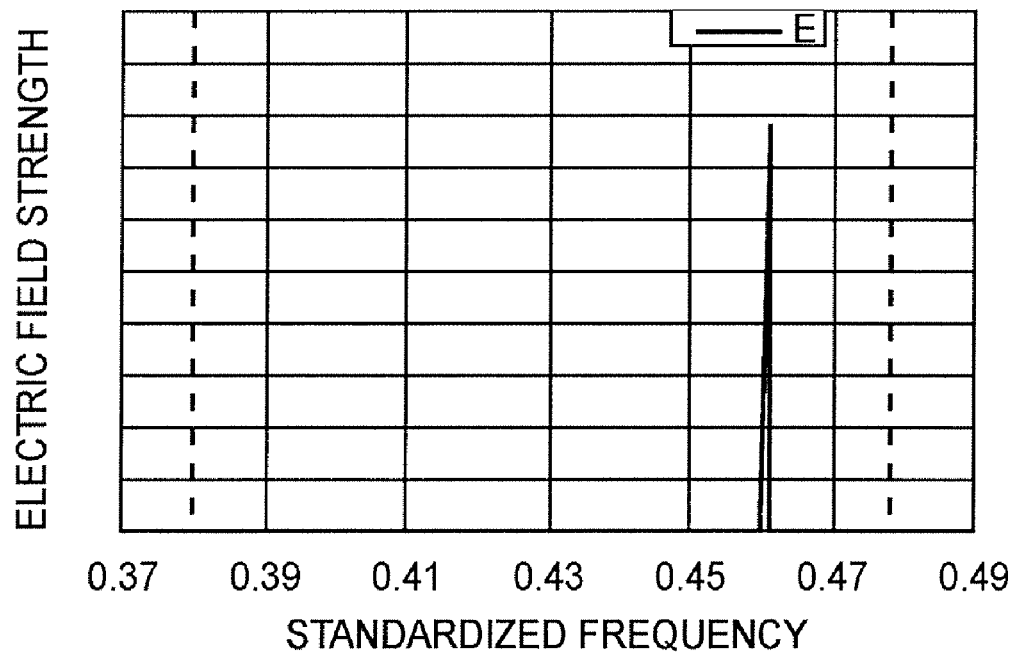
FIG. 8 is an illustration for explaining the defect mode spectrum in the first embodiment of the present invention.

For example, if the period defect member 150 is shaped by dx=0.60*a, dy=0.60*a and dz=0.25*a as shown in FIG. 4 and FIG. 5, then it is assured that only one defect mode can exist in the photonic band gap. FIG. 8 shows the defect mode spectrum where the periodic structure member 100 is provided with nine periods in the x direction, nine periods in the y direction and four periods in the z direction and where the period defect member 150 is placed at the center thereof.

In FIG. 8, vertical dotted lines show the band gap edge frequency of the complete photonic band gap. It is seen from FIG. 8 that the resonator of this embodiment realizes the single mode.

Figure 9:
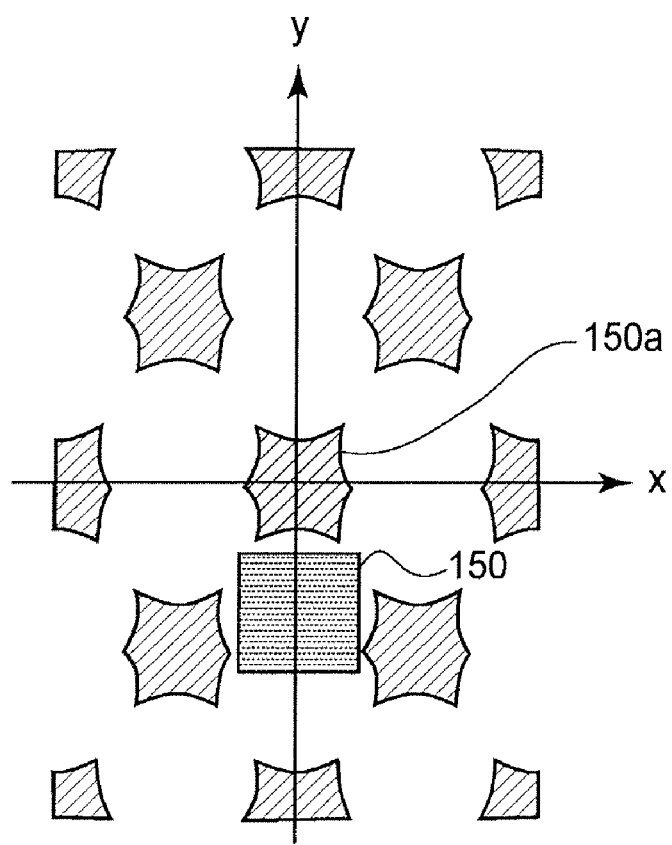
FIG. 9 is an illustration of a comparative example of the period defect member of the present invention.

FIG. 9 shows the x-y sectional view of the second layer when the period defect member 150 is disposed at the position being translationally shifted only by b/8 in the second axial direction (y direction) relative to the axis of the columnar structure 150a placed in the second layer.

Figure 10:
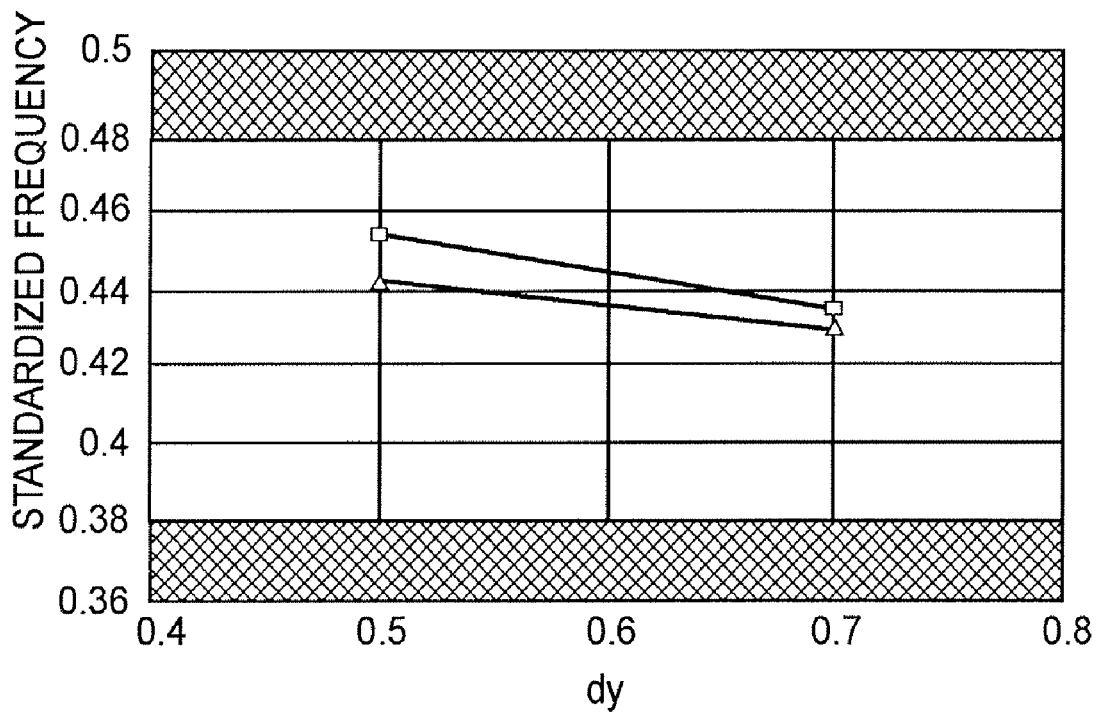
FIG. 10 is an illustration based on plane-wave extraction, for explaining the photonic band gap structure according to the first embodiment of the present invention.
Figure 11:
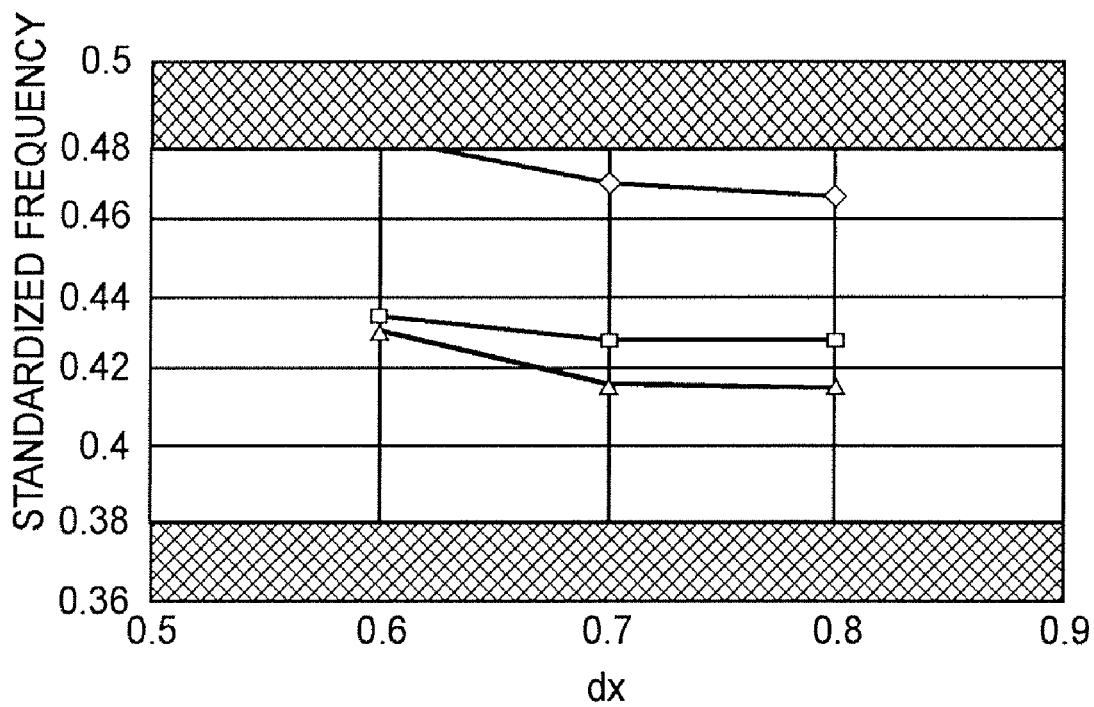
FIG. 11 is an illustration based on plane-wave extraction, for explaining the photonic band gap structure according to the first embodiment of the present invention.

FIG. 10 and FIG. 11 show the results of calculation based on the FDTD method (finite difference time domain method) made to reveal how the defect mode frequency changes to the parameters of the defect shape, when the period defect member 150 is provided in the manner described above.

FIG. 11 shows the relationship of the defect mode frequency to the dimension of dy, taking dx=0.60*a and dz=0.25*a. Also, FIG. 11 shows the relationship of the defect mode frequency to dx, taking dy=0.70*a and dz=0.25*a. In FIG. 10 and FIG. 11, the region depicted by hatching shows the frequency spectrum outside the complete photonic band gap. When the parameters of the defect shape are changed, since the shapes of these defect mode patterns are analogous, the change of each defect mode frequency to the defect shape is approximately at the same level. Therefore, if the period defect member 150 is disposed at the position shown in FIG. 9, the single mode is difficult to obtain.

In the resonator using a photonic crystal, the defect mode pattern formed inside the resonator has a shape that reflects the symmetric property of the photonic crystal.

When the period defect member is disposed at the position where the symmetric property of the photonic crystal is high, the defect mode as well becomes a mode having high symmetric property.

Any defect mode having the same symmetric property will be shrunk, and defect modes having different symmetric properties have different defect mode profiles.

Because of this, there would be a large difference in the amount of variation to each parameter of the defect shape. If the period defect member is disposed at a position where the symmetric property of the photonic crystal is low, plural defect mode patterns existing in the complete photonic band gap will have analogous shapes. However, they will not shrink. Therefore, the change of each defect mode frequency to the change of each parameter of the period defect member shape becomes approximately at the same level. From the above, it is seen that, in order to obtain a resonator having a photonic crystal and operable in a single mode, the period defect member should be disposed at the position where the symmetric property of the photonic crystal is high.

Hence, the period defect member is disposed on the axis of the layer laminating direction of the columnar structure. When practical manufacture is considered, there are cases where, for example, the position of the first direction of the period defect member has an error of about ±0.1*a. However, such an error does not affect the advantageous effects of the present invention.

As described above, the refractive indices of the first, second and third mediums of the periodic structure member and the circular hole radii R1 and R2 formed in each layer as well as the thickness of each layer, for example, are optimized, and additionally the shape of the period defect member is optimized, so as to realize a complete photonic band gap in the frequency band, including the desired defect mode frequency. By doing so, a desired defect mode frequency can be realized in a desired defect mode frequency interval, and thus a high-performance resonator having high light confinement effect can be accomplished.

Figure 2E:
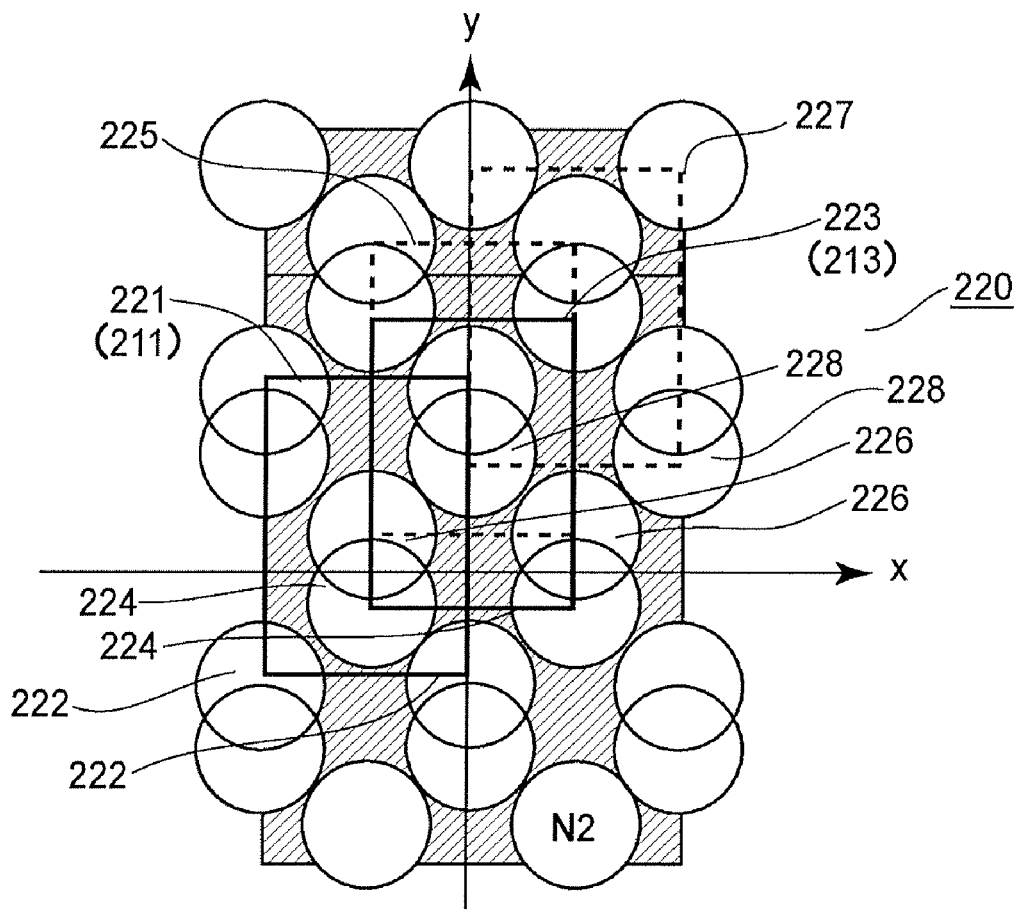
FIG. 2E is an illustration for explaining a modified example of three-dimensional photonic crystal of the present invention.

In the embodiment described above, circular holes are used to form a columnar structure in the second layer and the fourth layer. However, a polygonal column such as hexagonal prism having an axis in the layer laminating direction may be used as the columnar structure. The circular holes 222 and 224 and the circular holes 226 and 228 may not intersect with each other, as shown in FIG. 2E. Even in this case, since the symmetric property of the periodic structure member is kept, a desired defect mode frequency can be realized with a desired defect mode frequency interval, by optimizing the shape parameter of the periodic structure member and the shape parameter of the period defect member.

However, if a polygonal column is used as the columnar structure, the frequency band presenting a complete photonic band gap is narrowed by about 10%.

Also, if the circular holes 222 and 224 and the circular holes 226 and 228 do not intersect with each other, the frequency band presenting a complete photonic band gap is narrowed by about 35%. Therefore, the existence probability of light in the complete photonic band gap rises and, as a result, the light confinement effect becomes weak. Nonetheless, a resonator having better light confinement effect in comparison with a Fabry-Perot type resonator or VCSEL (Vertical Cavity Surface Emitting Laser) can be realized.

FIG. 2E shows a modified example of second layer 220. In FIG. 2E, in the direction along the layer plane, there are holes 222 and 224 comprising the second medium N2, provided at the lattice points of the first rectangular lattice 211 and the second rectangular lattice 213.

Furthermore, there are holes 226 and 228 comprising the second medium N2, provided at the lattice points of the third rectangular lattice 231, formed at the position taken by shifting the first rectangular lattice 211 by a/2 in the first axis (x axis) and by b/2 in the second axis (y axis).

Additionally, holes 226 and 228 comprising the second medium N2 are provided at the lattice points of the fourth rectangular lattice 233, disposed at the position taken by shifting the second rectangular lattice 213 by a/2 in the first axis and by b/2 in the second axis.

The regions except these holes are filled with the third medium N3. In this periodic structure, the holes 212 disposed at the lattice points of the first rectangular lattice 211 and the holes 214 disposed at the lattice points of the second rectangular lattice 213 do not intersect each other. Furthermore, the periodic structure is such that the holes 226 disposed at the lattice points of the third rectangular lattice 231 and the holes 228 placed at the lattice points of the fourth rectangular lattice 233 do not intersect each other.

It should be note that, in FIG. 2E, for correspondence with FIG. 2B, the first rectangular lattice 211 is illustrated as the 21st rectangular lattice 221; the second rectangular lattice 213 is illustrated as the 22nd rectangular lattice 223; the third rectangular lattice 231 is illustrated as the 23rd rectangular lattice 225; and the fourth rectangular lattice 233 is illustrated as the 24th rectangular lattice 227.

As for the fourth layer, s periodic structure such as included in the second layer is provided at the same position as that of the second layer, with respect to the direction along the layer plane.

Furthermore, the period defect member has a columnar structure placed at the position taken by shifting the lattice point of the first rectangular lattice (or third rectangular lattice) in the second layer (or fourth layer) by +3b/8 along the second axis. Alternatively, it may be a columnar structure placed in the second layer (or fourth layer) at the position taken by shifting the lattice point of the second rectangular lattice (or fourth rectangular lattice) by −3b/8 along the second axis.

TABLE 1

| | |
|---|---|
| Refractive Index N1 of 1st Medium | 3.3 |
| Refractive Index N2 of 2nd Medium | 1.0 |
| Refractive Index N3 of 3rd Medium | 3.3 |
| Radius R1 | 0.47 × a |
| Radius R2 | 0.36 × a |
| Thickness H1 of 1st and 3rd Layers 210 & 230 | 0.25 × a |
| Thickness H2 of 2nd and 4th Layers 220 & 240 | 0.25 × a |
| Period b | (square root of 2) × a |

Next, an example wherein, in the periodic structure member 100 of the first embodiment, the period defect member 100 is provided at the position different from the first embodiment, will be described.

Embodiment 2

Figure 12:
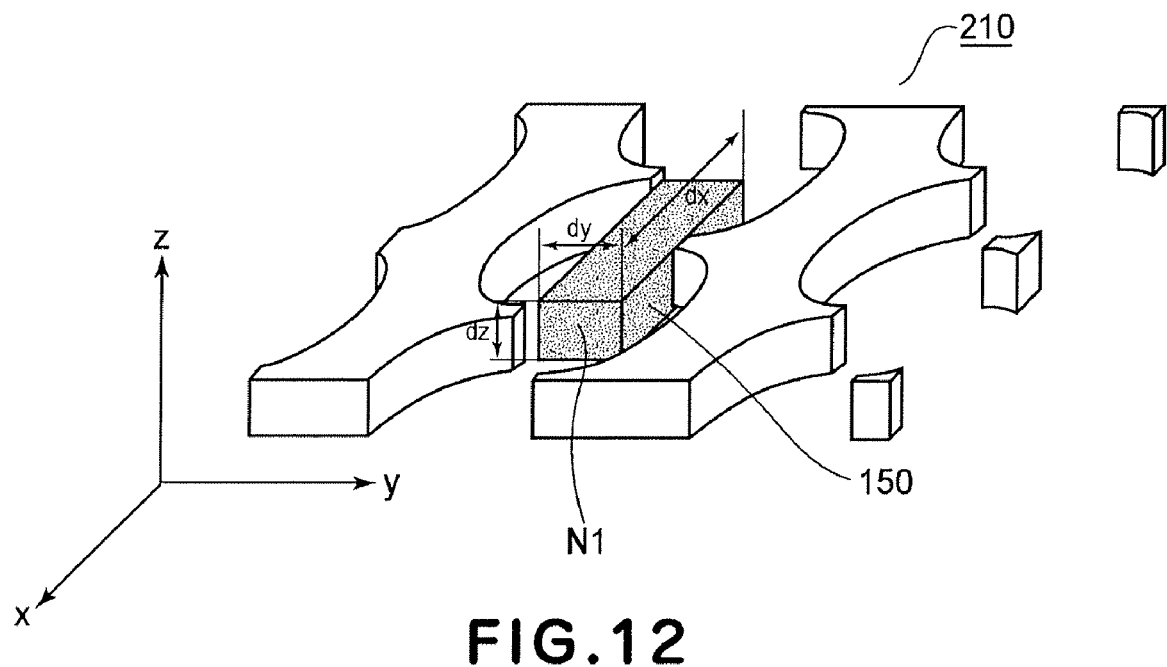
FIG. 12 is an illustration for explaining a portion around the period defect member of a three-dimensional photonic crystal, according to a second embodiment of the present invention.

FIG. 12 is an enlarged view of a main portion around the period defect member, which is a portion of a resonator according to a second embodiment of the present invention. As shown in FIG. 12, the period defect member 150 is provided in a first layer 210 and at the point of intersection between a first rectangular lattice 211 and a second rectangular lattice 213 of the first layer 210. The period defect member 150 is made of a first medium N1, and it has a rectangular parallelepiped shape having a thickness dz and widths dx and dy.

Figure 13:
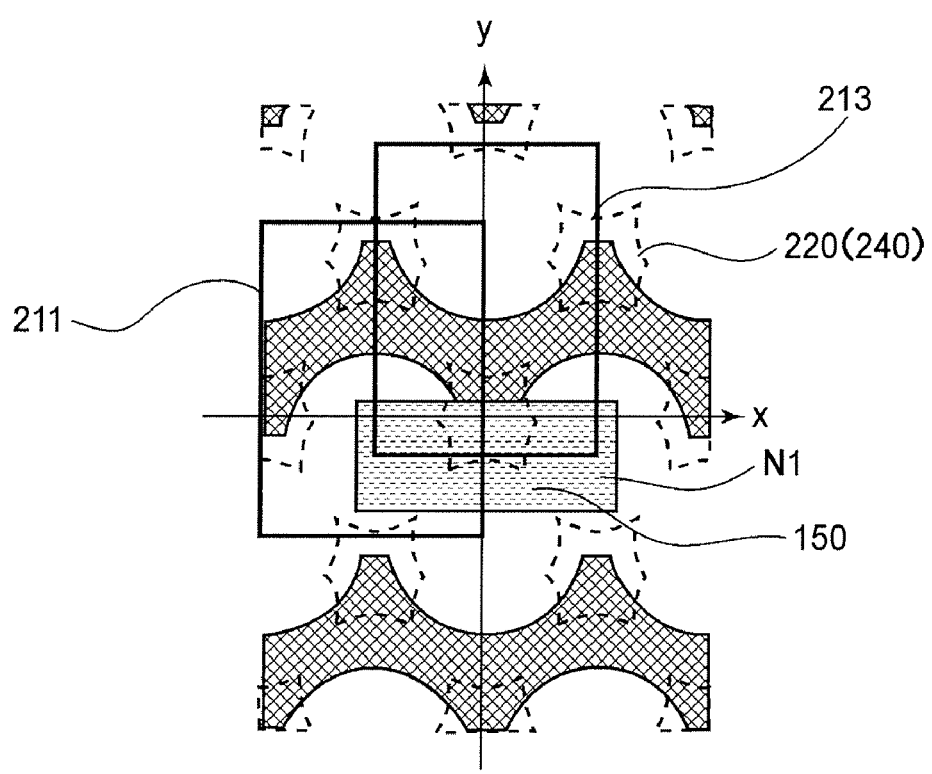
FIG. 13 is an x-y sectional view of the structure shown in FIG. 12.

FIG. 13 is an x-y sectional view of the structure shown in FIG. 12. In FIG. 13, the second layer 220 and the fourth layer 240 are depicted by dotted lines, for better understanding of the position of the period defect member 150. The periodic structure member 100 is similar to the first embodiment, and the shape of the periodic structure member 100 and the refractive index thereof have values shown in Table 1.

Figure 14:
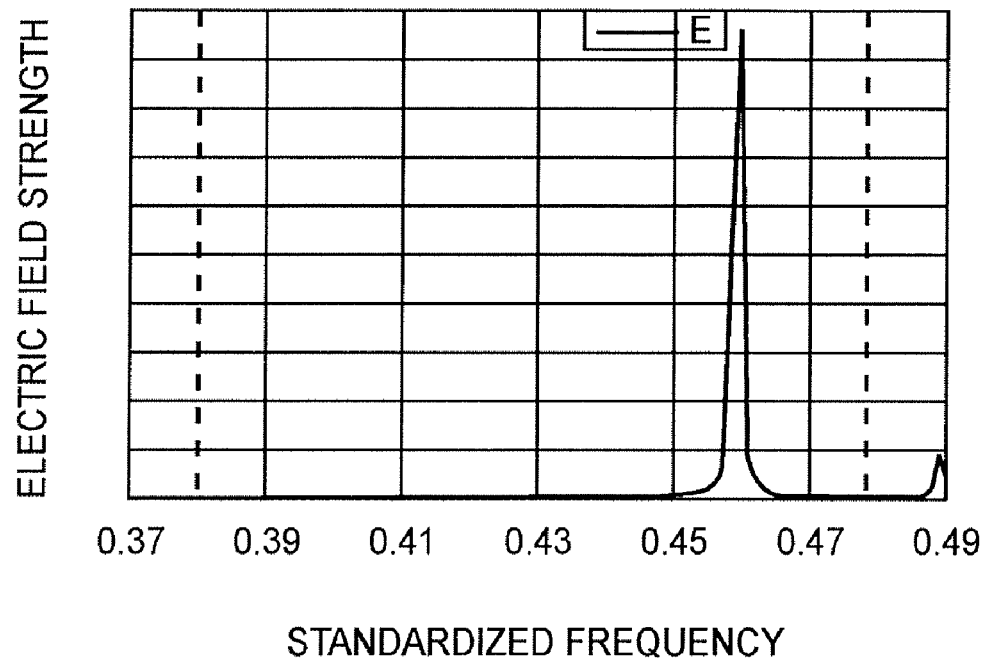
FIG. 14 is an illustration for explaining the defect mode spectrum in the second embodiment of the present invention.

In accordance with this embodiment, in FIG. 12 and FIG. 13, the period defect member has a shape of dx=0.60*a, dy=0.60*a and dz=0.25*a. As a result of this, it is assured that only one defect mode can exist in the photonic band gap. FIG. 14 shows the spectrum of defect mode in a case where the periodic structure member 100 is provided with nine periods in the x direction, nine periods in the y direction and four periods in the z direction, and where the period defect member 150 is placed at the center thereof. In FIG. 14, vertical dotted lines depict the band gap edge frequency of the complete photonic band gap. It is seen from FIG. 14 that the resonator of this embodiment realizes the single mode.

Here, the position of the period defect member 150 is disposed at the point of intersection between the first rectangular lattice 211 and the second rectangular lattice 213. When practical manufacture is considered, there are cases where, for example, the position of the period defect member has an error of about ±0.1*a. However, such an error does not affect the advantageous effects of the present invention.

Embodiment 3

Figure 15:
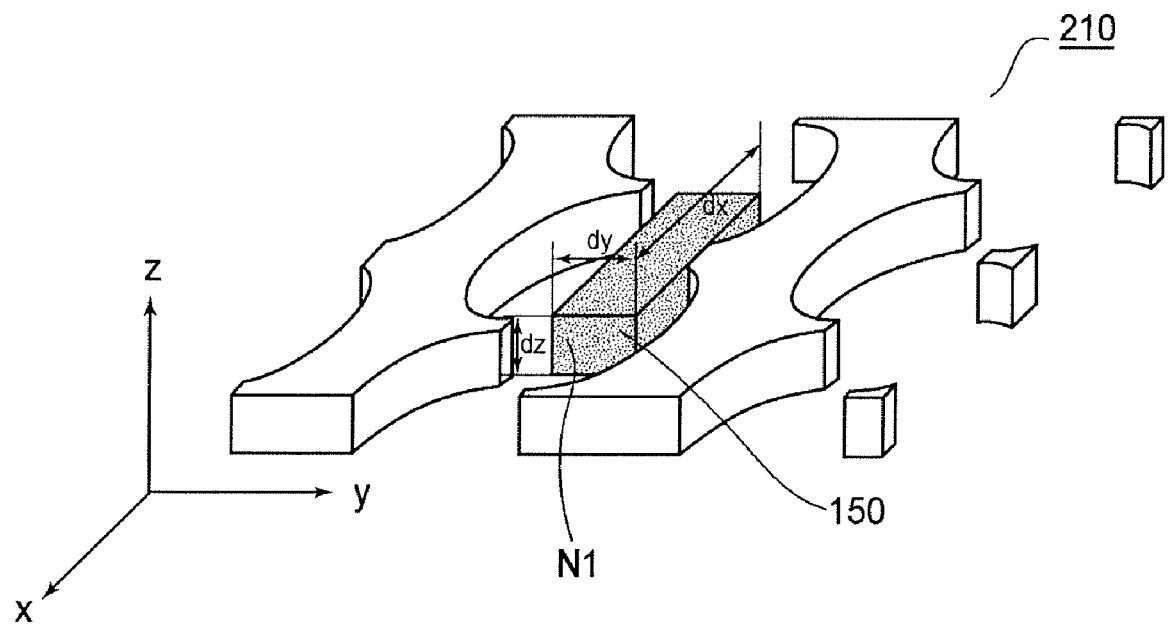
FIG. 15 is an illustration for explaining a portion around the period defect member of a three-dimensional photonic crystal, according to a third embodiment of the present invention.
Figure 16:
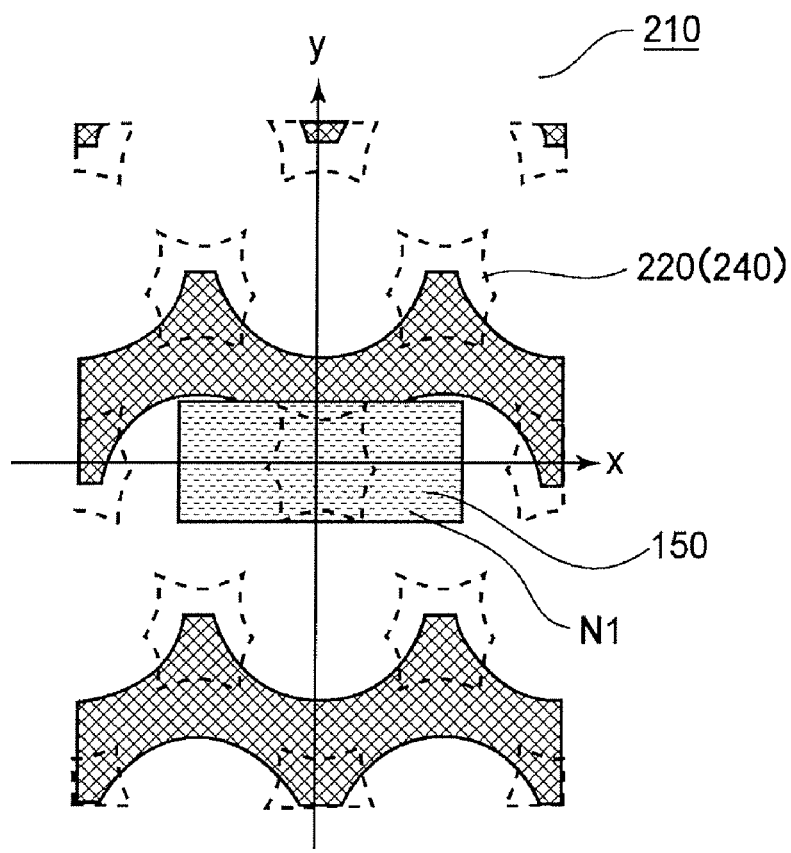
FIG. 16 is an x-y sectional view of the structure shown in FIG. 15.

FIG. 15 is an enlarged view of a main portion around the period defect member, which is a portion of a resonator according to a third embodiment of the present invention. As shown in FIG. 15, the period defect member 150 is provided in the first layer 210 and on the axis of the columnar structure inside the second layer 220. The period defect member 150 comprises a first medium N1, and it has a rectangular parallelepiped shape having a thickness dz and widths dx and dy. FIG. 16 is an x-y sectional view of the structure shown in FIG. 15. In FIG. 16, the second layer 220 and the fourth layer 240 are depicted by dotted lines, for better understanding of the position of the period defect member 150.

Thus, by forming the period defect member 150 in the manner described above, it is assured that, with respect to the electromagnetic wave of a particular frequency band among the frequency band inside the photonic band gap of the periodic structure member 100, the electromagnetic wave exists only in the defect member 150. As a result of this, the electromagnetic wave is confined in a very small region, and a high-performance resonator having high light confinement effect is accomplished thereby.

For example, in FIG. 12 and FIG. 13, the period defect member may have a shape of dx=0.70*a, dy=0.40*a and dz=0.25*a. This assures that only one defect mode can exist in the photonic band gap.

Figure 17:
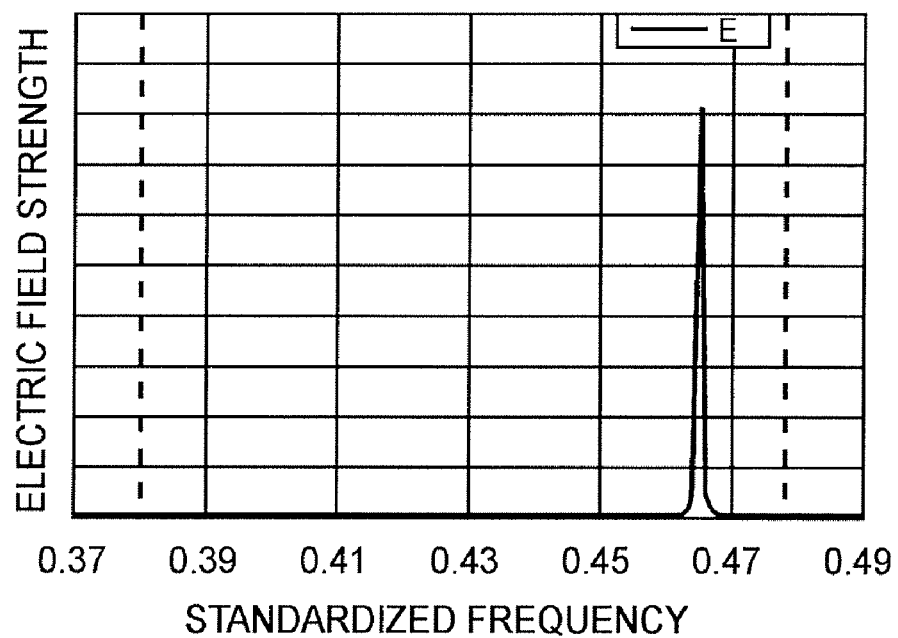
FIG. 17 is an illustration for explaining the defect mode spectrum in the third embodiment of the present invention.

FIG. 17 shows the spectrum of defect mode in a case where the periodic structure member 100 is provided with nine periods in the x direction, nine periods in the y direction and four periods in the z direction, and where the period defect member 150 is placed at the center thereof. In FIG. 17, vertical dotted lines depict the band gap edge frequency of the complete photonic band gap.

It is seen from FIG. 17 that the resonator of this embodiment realizes the single mode.

Here, the position of the period defect member 150 is disposed on the axis of the columnar structure provided in the second layer 220. When practical manufacture is considered, there are cases where, for example, the position of the period defect member has an error of about ±0.1*a. However, such an error does not affect the advantageous effects of the present invention.

The embodiments to be described below concern preferred examples wherein the refractive indices of mediums that constitute the periodic structure member and period defect member differ from the first embodiment.

Embodiment 4

The basic structure of the fourth embodiment of the present invention is approximately the same as that shown in FIG. 1-FIG. 5. Also, the positions of circular holes formed in the periodic structure member 100 are the same as those of the periodic structure described with reference to the first embodiment. The fourth embodiment differs from the first embodiment in the point of the medium constituting individual layers of the periodic structure member 100.

The parameters forming the periodic structure member 100 of the fourth embodiment are shown in Table 2. The values in Table 2 have been standardized with respect to the period a. Here, by analyzing the photonic band structure based on the plane wave unfolding method, it is seen that a complete photonic band structure is formed in the frequency band of normalized frequencies from 0.453 to 0.497.

The period defect member 150 is provided within the second layer and on the axis of the columnar structure (FIG. 2B). An enlarged view of a main portion around the period defect member 150 will be similar to FIG. 4, and an x-y sectional view will be similar to FIG. 5. The period defect member 150 comprises a third medium N3, and it has a rectangular parallelepiped shape having a thickness dz and widths dx and dy.

For example, as shown in FIG. 4 and FIG. 5, the period defect member may have a shape of dx=1.40*a, dy=1.00*a and dz=0.20*a. This assures that only one defect mode can exist in the photonic band gap.

Figure 18:
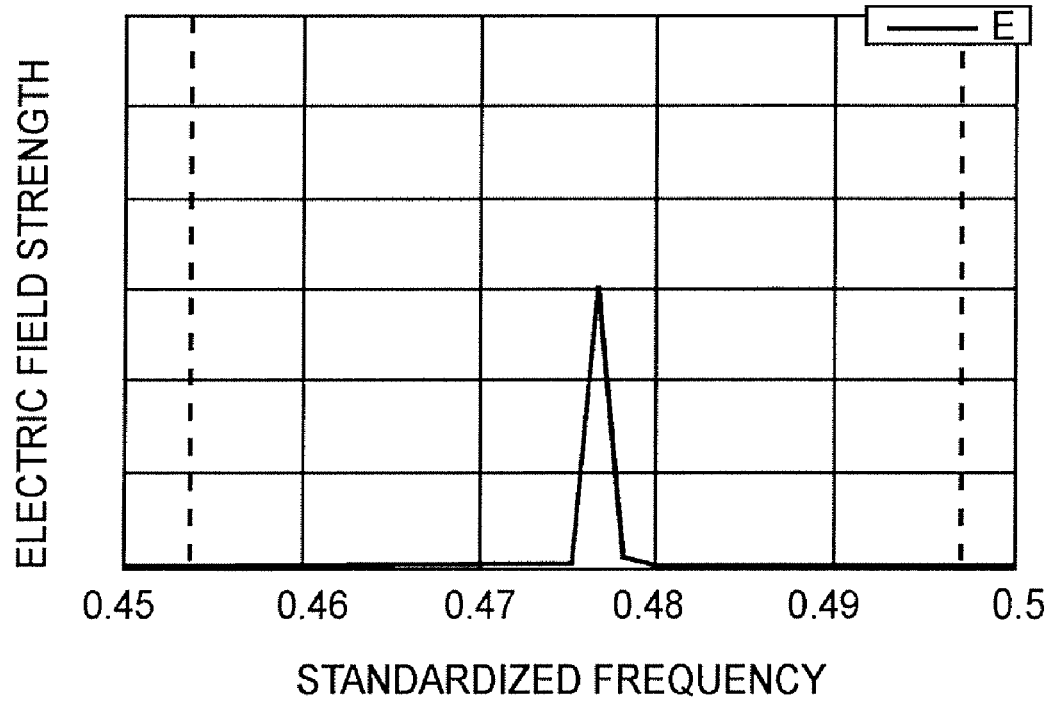
FIG. 18 is an illustration for explaining the defect mode spectrum in a fourth embodiment of the present invention.

FIG. 18 shows the spectrum of defect mode in a case where the periodic structure member 100 is provided with nine periods in the x direction, nine periods in the y direction and four periods in the z direction, and where the period defect member 150 is placed at the center thereof.

In FIG. 18, vertical dotted lines depict the band gap edge frequency of the complete photonic band gap.

As shown in FIG. 18, even when the medium refractive indices N1-N3 constituting the periodic structure part 100 and the period defect member 150 are chosen as shown in Table 2, a single mode can be realized by disposing the period defect member 150 at the position taking into account the symmetric property of the periodic structure member 100.

Thus, even if the refractive index of the medium constituting the periodic structure member 100 and the period defect member 150 changes, the advantageous effects of the present embodiment wouldn't be lost.

Here, the position of the period defect member 150 is disposed on the axis of the columnar structure of the second layer 220. When practical manufacture is considered, there are cases where, for example, the position of the period defect member has an error of about ±0.1*a. However, such an error does not affect the advantageous effects of the present invention.

Furthermore, although the refractive index N1 of the first medium and the refractive index N3 of the third medium are the same in this embodiment, this may be changed to N1=2.4 and N3=3.3, for example.

In that case, the frequency band presenting a complete photonic band gap will be broadened by about 30%, as compared with the periodic structure of this embodiment. Therefore, a resonator having a better light confinement effect and operating in a single mode will be obtained. However, when individual layers are formed sequentially to produce a three-dimensional photonic crystal, the layer comprising the third medium has to be formed on the layer comprising the first medium, through a film forming process on fuse-bonding process.

Since forming a film on a medium having a different lattice constant or fuse-bonding of different mediums having different surface states requires high techniques, in this sense it is preferable that the first and third mediums comprise the same medium.

TABLE 2

| | |
|---|---|
| Refractive Index N1 of 1st Medium | 2.4 |
| Refractive Index N2 of 2nd Medium | 1.0 |
| Refractive Index N3 of 3rd Medium | 2.4 |
| Radius R1 | 0.435 × a |
| Radius R2 | 0.34 × a |
| Thickness H1 of 1st and 3rd Layers 210 & 230 | 0.30 × a |
| Thickness H2 of 2nd and 4th Layers 220 & 240 | 0.20 × a |
| Period b | (square root of 2) × a |

The embodiments to be described below concern examples wherein, in a resonator using the three-dimensional photonic crystal, the medium constituting the period defect member 150 and the medium constituting the periodic structure member 100 have different refractive indices.

Embodiment 5

In the fifth embodiment of the present invention, the period defect member 150 is placed in the second layer 220 (FIG. 2B) and disposed on the axis of the layer lamination direction of the columnar structure of the second layer 220. The enlarged view of a main portion adjacent the period defect member 150 will be similar to FIG. 4, and the x-y sectional view thereof will be similar to FIG. 5.

The period defect member 150 has a rectangular parallelepiped shape having a thickness dz and widths dx and dy. The parameters constituting the periodic structure 100 were chosen as shown in Table 1, and the refractive index of the period defect member 150 was 3.5.

Figure 19:
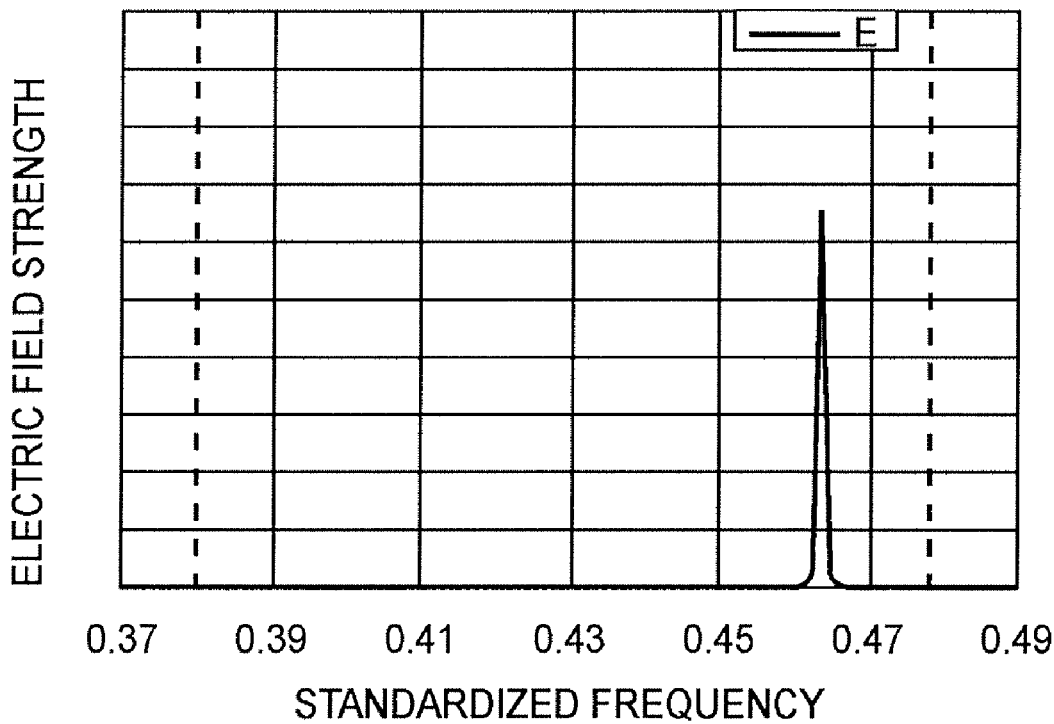
FIG. 19 is an illustration for explaining the defect mode spectrum in a fifth embodiment of the present invention.

For example, as shown in FIG. 4 and FIG. 5, the period defect member may have a shape of dx=0.60*a, dy=0.50*a and dz=0.25*a. This assures that only one defect mode can exist in the photonic band gap. FIG. 19 shows the spectrum of defect mode in a case where the periodic structure member 100 is provided with nine periods in the x direction, nine periods in the y direction and four periods in the z direction, and where the period defect member 150 is placed at the center thereof. In FIG. 19, vertical dotted lines depict the band gap edge frequency of the complete photonic band gap. It is seen from FIG. 19 that the resonator of this embodiment realizes the single mode even when the refractive index of 3.5 was chosen for the period defect member 150.

Here, the position of the period defect member 150 is disposed on the axis of the columnar structure. When practical manufacture is considered, there are cases where, for example, the position of the period defect member has an error of about ±0.1*a. However, such an error does not affect the advantageous effects of the present invention.

As described above, the advantageous effects of the present embodiment wouldn't be lost even when the periodic structure member and the period defect member have different refractive indices.

Embodiment 6

Next, a sixth embodiment concerning a light functional device as a device using a resonator of the present invention will be described. In this embodiment, the period defect member (point defect member) in the three-dimensional photonic crystal in the first to fifth embodiments is filled with an active medium having photogenesis.

An energy is supplied to this active medium from the outside, based on electromagnetic waves or electric currents, by which a light emitting element (device) such as an LED (light emitting diode) or a laser having a very high efficiency is accomplished. As regards the active medium filling the period defect member, it can be selected based on the desired emission wavelength, from a multiquantum well structure of InGaAsP, AlGaAs, AlGaInP, AlGaN, InGaN, ZnSe or ZnS series, or a multiquantum dot structure or an organic material, for example.

By this, a high efficiency laser light source suitable to a light source for display units, a light source for optical communication, a THz light source, or a light source for optical pickups such as DVD, for example, is accomplished.

Figure 20:
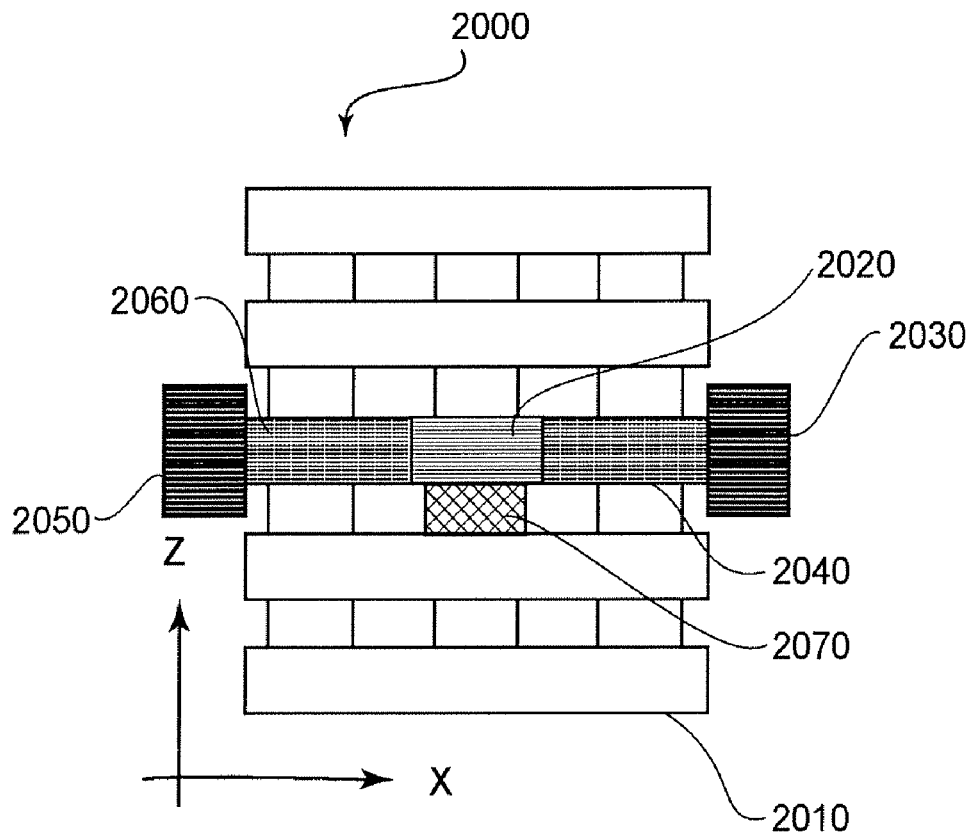
FIG. 20 is an illustration of a laser device according to the present invention.

FIG. 20 shows a structural example of laser device in which an active member configured to emit light in response to carrier injection is formed in the period defect member.

The laser device 2000 uses a resonator which is formed by providing a period defect member 2020 according to one of the first to fifth embodiments, in the periodic structure member 2010. The laser device 2000 has a p-type electrode 2030, a p-type carrier conducting pathway 2040, an n-type electrode 2050, an n-type carrier conducting pathway 2060, and a waveguide 2070.

Inside the resonator 2020, there is an active member presenting the photogenesis in response to carrier injection. The waveguide 2070 functions as a defect waveguide which is formed by providing a defect member, disturbing the period, in the periodic structure member 2010. With regard to the wave guide mode of the waveguide 2070, it is determined by optimizing the shape and refractive index of the defect member so that the coupling efficiency with the resonator 2020 becomes high, in consideration of the resonance mode of the resonator 2020.

The defect member is provided by changing the shape or refractive index of the columnar structure of the periodic structure member 2010, or by adding a separate columnar structure, for example. Through the p-type electrode 2030 and the p-type carrier conducting pathway 2040, electron holes are supplied to the resonator 2020.

On the other hand, through the n-type electrode 2050 and the n-type carrier conducting pathway 2060, electrons are supplied to the resonator 2020. The electrons are coupled inside the resonator to cause light emission and laser oscillation, and radiation is outputted through the waveguide 2070.

Further, the period defect member (point defect member) inside the three-dimensional photonic crystal having been explained with reference to the first to fifth embodiments is filled with a non-linearity medium. Then, an energy is supplied to this non-linearity medium from the outside, based on electromagnetic waves or electric currents, by which light having a very strong energy can be confined in a very narrow region. Based on this, a nonlinear optical element that provides a very strong nonlinear optical effect can be accomplished.

As regards the non-linear medium, $LiNbO_3$, $LiTaO_3$, $BaTiO_3$, $ZnO$, $BaB_2O_4$, $BiB_3O_6$ or $KTiOPO_4$ may be used.

Figure 21:
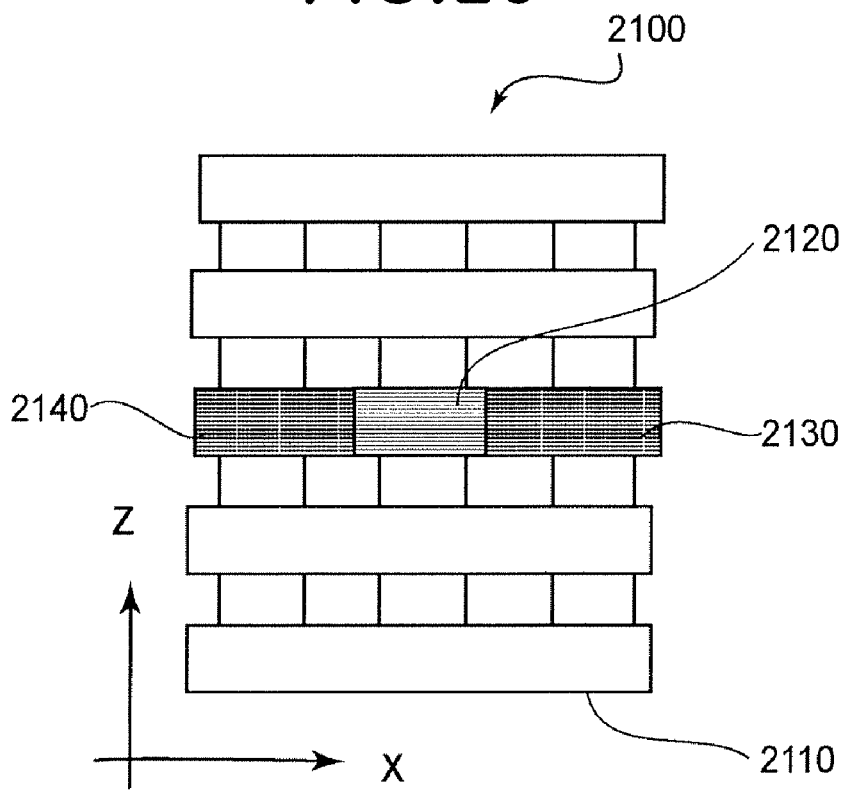
FIG. 21 is an illustration of a wavelength conversion element according to the present invention.

FIG. 21 shows a structural example of wavelength conversion element as a device based on the nonlinear optical effect.

The wavelength conversion element 2100 comprises a resonator which is formed by providing a period defect member 2120 according to one of the first to fifth embodiments, in the periodic structure member 2110. Furthermore, it comprises an input waveguide 2130 and an output waveguide 2140. The inside of the resonator 2120 is filled with a non-linearity medium.

The input waveguide 2130 and output waveguide 2140 function as a defect waveguide which is formed by providing a defect member, disturbing the period, in the periodic structure member 2110. The guiding wavelength is determined in accordance with the shape or refractive index of the defect member.

The light directed to the input waveguide 2130 via a lens or a fiber from the outside is converted into second or higher harmonics within the resonator, and it is outputted through the output waveguide 2140. The guiding wavelength region of the input waveguide 2130 is so determined as to include the wavelength of the input light but not to include the wavelength of the light after the conversion. The guiding wavelength region of the output waveguide 2140 is determined so as to include the wavelength of the light after the conversion but not to include the wavelength of the input light.

With this arrangement, efficient wavelength conversion and extraction of light is accomplished. Furthermore, a plurality of wavelengths may be used as the input light and, based on the nonlinear effect such as sum frequency or difference frequency other than the harmonics, the converted light may be outputted.

Furthermore, a wavelength selective filter may be formed by using a three-dimensional photonic crystal resonator 10 shown in the first to fifth embodiments and, in that occasion, the light of a frequency corresponding to the defect mode can be extracted with high selectivity.

Furthermore, a high-performance optical circuit can be realized by putting these light functional devices together.

Additionally, a microminiature-size high-performance optical circuit can be realized by using periodic structure members of the same shape in common.

As described above, in accordance with these embodiments, when a point defect is introduced into a three-dimensional photonic crystal to provide a function as a resonator, a desired defect mode frequency can be realized at a desired defect mode frequency interval, while keeping the symmetric property of the defect mode pattern. As a result of this, a high-performance resonator having good light confinement effect can be accomplished.

In addition, in these embodiments, regardless of using a fewer number of layers forming the basic period, a point defect is introduced into the three-dimensional photonic crystal presenting a wide complete photonic band gap. By this, a desired defect mode frequency can be realized in a desired defect mode frequency interval, and a high high-performance resonator having good light confinement effect is accomplished.

Because of this, when a resonator according to these embodiments is applied to a laser device, a high efficiency laser that can oscillate in a single mode and at a desired frequency can be realized and, hence, a high-performance light functional device can be accomplished.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2006-207907 filed Jul. 31, 2006, for which is hereby incorporated by reference.

What is claimed is:

1. A resonator, comprising: a three-dimensional photonic crystal; and a period defect member provided in said three-dimensional photonic crystal, wherein said three-dimensional photonic crystal includes a periodic structure member having periodically laminated layers including a refractive index periodic structure, wherein said periodic structural member includes (i) a first layer having a periodic structure being provided with holes which comprise a second medium and which are formed at lattice points of a first rectangular lattice having a period a along a first axis extending along a plane of the first layer and a period b along a second axis extending along the plane of the first layer and being perpendicular to the first axis, and at lattice points of a second rectangular lattice defined at a position determined by shifting the first rectangular lattice by a/2 along the first axis and by b/4 along the second axis, wherein a region of the first layer other than the holes is filled with a first medium, (ii) a second layer having a periodic structure with a columnar structure which comprises a third medium and has an axis extending in a layer lamination direction and which is formed at lattice points of a face-centered rectangular lattice defined at a position determined by shifting the first rectangular lattice by +3b/8 along the second direction and having a period a along the first axis and a period b along the second axis, wherein a region of the second layer other than the columnar structure is filled with the second medium, (iii) a third layer having a periodic structure formed by providing the periodic structure included in the first layer at a position shifted by a/2 along the first axis and by b/2 along the second axis relative to the first layer and with respect to a direction along the plane of the second layer, and (iv) a fourth layer having a periodic structure formed by providing the periodic structure included in the second layer at the same position as the second layer with respect to a direction along the plane of the second layer, wherein the first, second, third and fourth layers are laminated in this order, and wherein said periodic defect member includes a columnar structure provided at the second layer or the fourth layer and on an axis of the columnar structure formed in the second layer or the fourth layer; wherein the holes formed in the first and third layers of said three-dimensional photonic crystal have a circular sectional shape along the plane of the layers, and wherein said resonator is operable in a single mode.

2. A resonator, comprising: a three-dimensional photonic crystal; and a period defect member provided in said three-dimensional photonic crystal, wherein said three-dimensional photonic crystal includes a periodic structure member having periodically laminated layers including a refractive index periodic structure, wherein said periodic structural member includes (i) a first layer having a periodic structure being provided with holes which comprise a second medium and which are formed at lattice points of a first rectangular lattice having a period a along a first axis extending along a plane of the first layer and a period b along a second axis extending along the plane of the first layer and being perpendicular to the first axis, and at lattice points of a second rectangular lattice defined at a position determined by shifting the first rectangular lattice by a/2 along the first axis and by b/4 along the second axis, wherein a region of the first layer other than the holes is filled with a first medium, (ii) a second layer having a periodic structure with a columnar structure which comprises a third medium and has an axis extending in a layer lamination direction and which is formed at lattice points of a face-centered rectangular lattice defined at a position determined by shifting the first rectangular lattice by +3b/8 along the second direction and having a period a along the first axis and a period b along the second axis, wherein a region of the second layer other than the columnar structure is filled with the second medium, (iii) a third layer having a periodic structure formed by providing the periodic structure included in the first layer at a position shifted by a/2 along the first axis and by b/2 along the second axis relative to the first layer and with respect to a direction along the plane of the second layer, and (iv) a fourth layer having a periodic structure formed by providing the periodic structure included in the second layer at the same position as the second layer with respect to a direction along the plane of the second layer, wherein the first, second, third and fourth layers are laminated in this order, and wherein said periodic defect member includes a columnar structure provided at a point of intersection between the first and second rectangular lattices of the first layer or the third layer; wherein the holes formed in the first and third layers of said three-dimensional photonic crystal have a circular sectional shape along the plane of the layers, and wherein said resonator is operable in a single mode.

3. A resonator, comprising: a three-dimensional photonic crystal; and a period defect member provided in said three-dimensional photonic crystal, wherein said three-dimensional photonic crystal includes a periodic structure member having periodically laminated layers including a refractive index periodic structure, wherein said periodic structural member includes (I) a first layer having a periodic structure being provided with holes which comprise a second medium and which are formed at lattice points of a first rectangular lattice having a period a along a first axis extending along a plane of the first layer and a period b along a second axis extending along the plane of the first layer and being perpendicular to the first axis, and at lattice points of a second rectangular lattice defined at a position determined by shifting the first rectangular lattice by a/2 along the first axis and by b/4 along the second axis, wherein a region of the first layer other than the holes is filled with a first medium, (ii) a second layer having a periodic structure with a columnar structure which comprises a third medium and has an axis extending in a layer lamination direction and which is formed at lattice points of a face-centered rectangular lattice defined at a position determined by shifting the first rectangular lattice by +3b/8 along the second direction and having a period a along the first axis and a period b along the second axis, wherein a region of the second layer other than the columnar structure is filled with the second medium, (iii) a third layer having a periodic structure formed by providing the periodic structure included in the first layer at a position shifted by a/2 along the first axis and by b/2 along the second axis relative to the first layer and with respect to a direction along the plane of the second layer, and (iv) a fourth layer having a periodic structure formed by providing the periodic structure included in the second layer at the same position as the second layer with respect to a direction along the plane of the second layer, wherein the first, second, third and fourth layers are laminated in this order, and wherein said periodic defect member includes a columnar structure provided at the first layer or the third layer and on an axis of the columnar structure formed in the second layer or the fourth layer; wherein the holes formed in the first and third layers of said three-dimensional photonic crystal have a circular sectional shape along the plane of the layers, and wherein said resonator is operable in a single mode.

4. A resonator according to any one of claims 1-3, wherein the columnar structures of the second and fourth layers of said three-dimensional photonic crystal are provided by (a) holes comprising the second medium and formed at lattice points of the first and second rectangular lattices, a lattice point of a third rectangular lattice defined at a position determined by shifting the first rectangular lattice by a/2 along the first axis and by b/2 along the second axis, and a lattice point of a fourth rectangular lattice defined at a position determined by shifting the second rectangular lattice by a/2 along the first axis and by b/2 along the second axis, and (b) a region for the columnar structure.

5. A resonator according to any one of claims 1-3, wherein the holes formed in the second and fourth layers of said three-dimensional photonic crystal have a circular sectional shape along the plane of the layers.

6. A resonator according to any one of claims 1-3, wherein the first, second and third mediums comprise the same medium.

7. A resonator, comprising: a three-dimensional photonic crystal; and a period defect member provided in said three-dimensional photonic crystal, wherein said three-dimensional photonic crystal includes a periodic structure member having periodically laminated layers including a refractive index periodic structure, wherein said periodic structural member includes (I) a first layer having a periodic structure being provided with holes which comprise a second medium and which are formed at lattice points of a first rectangular lattice having a period a along a first axis extending along a plane of the first layer and a period b along a second axis extending along the plane of the first layer and being perpendicular to the first axis, and at lattice points of a second rectangular lattice defined at a position determined by shifting the first rectangular lattice by a/2 along the first axis and by b/4 along the second axis, wherein a region of the first layer other than the holes is filled with a first medium, (ii) a second layer having a periodic structure being provided with holes which comprise the second medium and which are formed, with respect to a direction along the layer, at lattice points of the first and second rectangular lattices, a lattice point of a third rectangular lattice defined at a position determined by shifting the first rectangular lattice by a/2 along the first axis and by b/2 along the second axis, and a lattice point of a fourth rectangular lattice defined at a position determined by shifting the second rectangular lattice by a/2 along the first axis and by b/2 along the second axis, wherein a region other than the holes is filled with the third medium, and wherein the hole formed at the lattice point of the first rectangular lattice does not intersect with the hole formed at the lattice point of the second rectangular lattice, while the hole formed at the lattice point of the third rectangular lattice does not intersect with the hole formed at the lattice point of the fourth rectangular lattice, (iii) a third layer having a periodic structure formed by providing the periodic structure included in the first layer at a position shifted by a J2 along the first axis and by b/2 along the second axis relative to the first layer and with respect to a direction along the plane of the second layer, and (iv) a fourth layer having a periodic structure formed by providing the periodic structure included in the second layer at the same position as the second layer with respect to a direction along the plane of the second layer, wherein the first, second, third and fourth layers are laminated in this order, and wherein said periodic defect member includes a columnar structure provided at the second layer or the fourth layer and at one of (a) a position determined by shifting the lattice point of the first rectangular lattice or the third rectangular lattice in the second layer or the fourth layer by +3b/8 along the second axis, and (b) a position determined by shifting the lattice point of the second rectangular lattice or the fourth rectangular lattice by −3b/8 along the second axis. wherein the holes formed in the first and third layers of said three-dimensional photonic crystal have a circular sectional shape along the plane of the layers, and wherein said resonator is operable in a single mode.

8. A resonator according to claim 7, wherein the holes formed in the second and fourth layers of said three-dimensional photonic crystal have a circular sectional shape along the plane of the layers.

9. A resonator according to claim 7, wherein the first and third mediums comprise the same medium.

10. A light emitting element, comprising: a resonator as recited in any one of claims 1-3, said resonator having formed therein an active medium having a light emitting function; and exciting means for exciting the active medium.

11. A wavelength converting element, comprising: a resonator as recited in any one of claims 1-3 and having a period defect member; and a non-linearity medium provided in the period defect member of said resonator.

12. A wavelength selecting filter, including a resonator as recited in any one of claims 1-3.

* * * * *